United States Patent
Kawahara et al.

(10) Patent No.: US 10,851,014 B2
(45) Date of Patent: Dec. 1, 2020

(54) DEVICE FOR APPLYING RELEASE AGENT TO GLASS BOTTLE FINISHING MOLD, METHOD FOR APPLYING RELEASE AGENT TO GLASS BOTTLE FINISHING MOLD, DEVICE FOR MANUFACTURING GLASS BOTTLE, AND METHOD FOR MANUFACTURING GLASS BOTTLE

(71) Applicant: NIHON YAMAMURA GLASS CO., LTD., Amagasaki (JP)

(72) Inventors: Ryusuke Kawahara, Amagasaki (JP); Takahiro Nishimura, Amagasaki (JP); Ryu Wada, Amagasaki (JP); Kunikazu Ohnishi, Amagasaki (JP); Hiroshi Ikeda, Amagasaki (JP); Hiroshi Nakajima, Amagasaki (JP); Shota Ishiguro, Amagasaki (JP)

(73) Assignee: NIHON YAMAMURA GLASS CO., LTD., Hyogo (JP)

( * ) Notice: Subject to any disclaimer, the term of this patent is extended or adjusted under 35 U.S.C. 154(b) by 0 days.

(21) Appl. No.: 16/835,061

(22) Filed: Mar. 30, 2020

(65) Prior Publication Data
US 2020/0255323 A1 Aug. 13, 2020

Related U.S. Application Data

(63) Continuation of application No. PCT/JP2018/035977, filed on Sep. 27, 2018.

(30) Foreign Application Priority Data

Sep. 29, 2017 (JP) ................................. 2017-189686
Sep. 21, 2018 (JP) ................................. 2018-177968

(51) Int. Cl.
C03B 40/027 (2006.01)
C03B 9/16 (2006.01)
C03B 9/41 (2006.01)

(52) U.S. Cl.
CPC ............ *C03B 40/027* (2013.01); *C03B 9/165* (2013.01); *C03B 9/41* (2013.01)

(58) Field of Classification Search
CPC .............................. C03B 40/02; C03B 40/027
See application file for complete search history.

(56) References Cited

U.S. PATENT DOCUMENTS

| | | | | |
|---|---|---|---|---|
| 4,765,821 A | * | 8/1988 | Doud | ...... C03B 9/406 65/169 |
| 4,867,777 A | * | 9/1989 | Doud | ........ C03B 9/40 65/26 |

(Continued)

FOREIGN PATENT DOCUMENTS

| | | |
|---|---|---|
| CN | 1375469 A | 10/2002 |
| CN | 202449979 U | 9/2012 |

(Continued)

*Primary Examiner* — Cynthia Szewczyk
(74) *Attorney, Agent, or Firm* — Rabin & Berdo, P.C.

(57) ABSTRACT

This invention eliminates the need for a manual work of applying a mold release lubricant to blow molds and bottom molds by workers and reduces a burden on workers involved in the mold release lubricant application work while also increasing the safety of workers during mold release lubricant application, reducing downtime associated with the mold release lubricant application work, reducing changes in the mold release lubricant application locations and variations in amount of application for the blow molds, and, furthermore, contributing to a glass bottle quality stabilization.

The application equipment (40) for applying the mold release lubricant is structured to apply the mold release lubricant to at least either a part of blow mold forming (Continued)

surfaces (31*f*) provided on the blow molds (31), or the entire surface of bottom mold forming surfaces (32*f*) provided on the bottom molds (32) located in the lower part of a finish molds (31), or both.

17 Claims, 14 Drawing Sheets

(56) References Cited

U.S. PATENT DOCUMENTS

| | | | |
|---|---|---|---|
| 2003/0168372 A1* | 9/2003 | Headen | C03C 17/34 |
| | | | 206/459.1 |
| 2009/0173105 A1 | 7/2009 | Zanella et al. | |
| 2018/0002218 A1* | 1/2018 | Mobayed | C03B 40/027 |
| 2018/0201537 A1 | 7/2018 | Valli et al. | |

FOREIGN PATENT DOCUMENTS

| | | |
|---|---|---|
| EP | 2824085 A1 | 1/2015 |
| JP | H06030816 Y2 | 8/1994 |
| JP | H0699155 B2 | 12/1994 |
| JP | 2003335530 A | 11/2009 |
| JP | 2009538818 A | 11/2009 |
| JP | 6277308 B1 | 2/2018 |
| WO | 2009127447 A1 | 10/2009 |
| WO | 2013192260 A1 | 12/2013 |
| WO | 2017032383 A1 | 3/2017 |

\* cited by examiner

FIG. 2
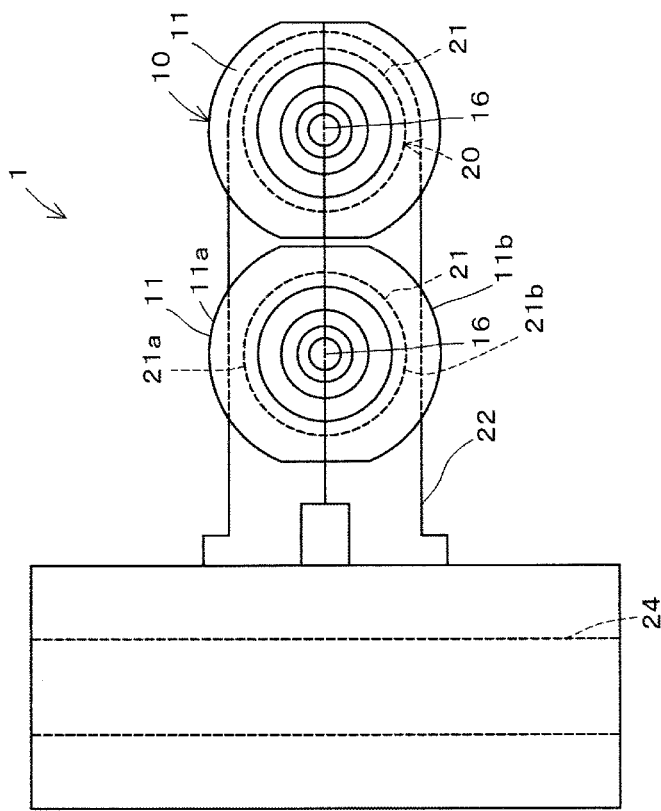
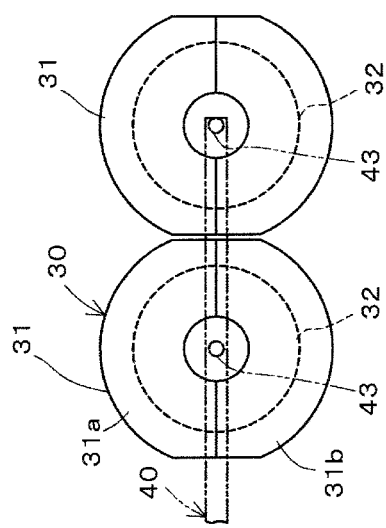

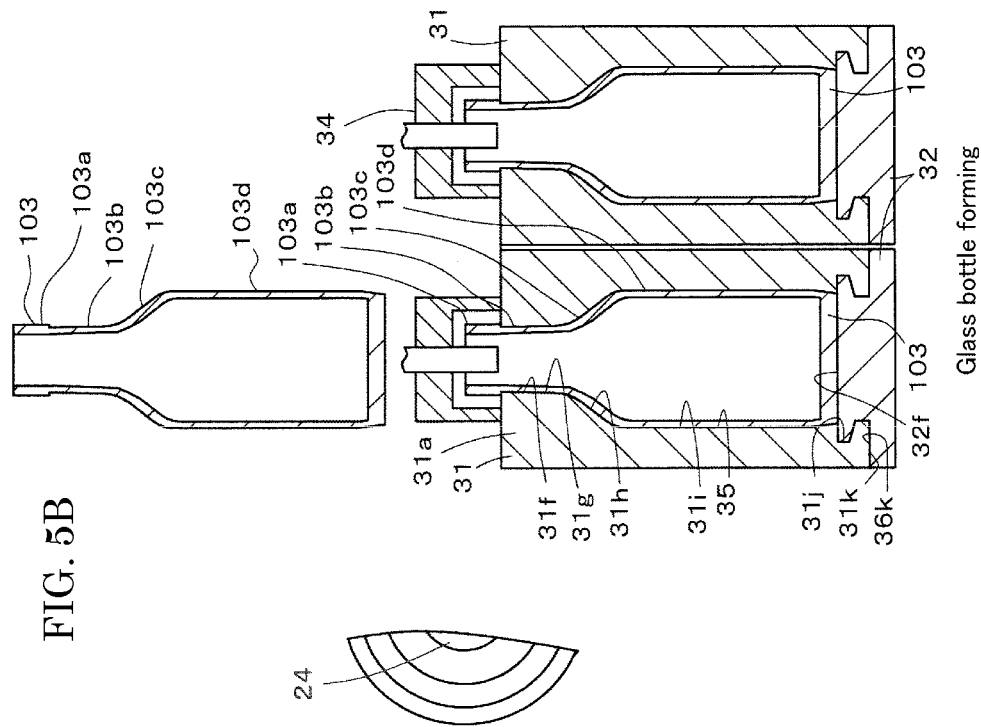
FIG. 5A  Transferring a parison to a blow mold
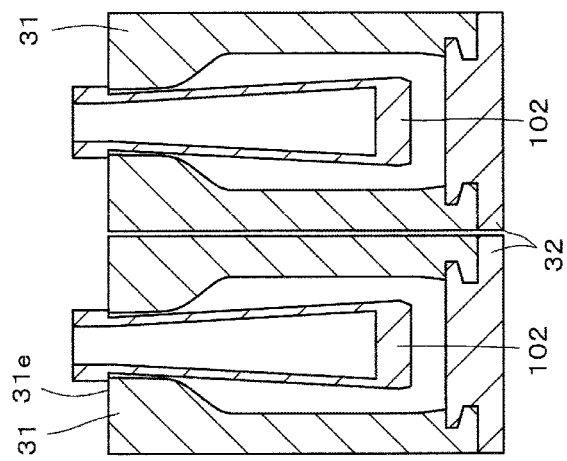
FIG. 5B  Glass bottle forming S2: The swab cycle preparation operation S3: Operation of applying a mold release lubricant The first modification example FIG. 12A
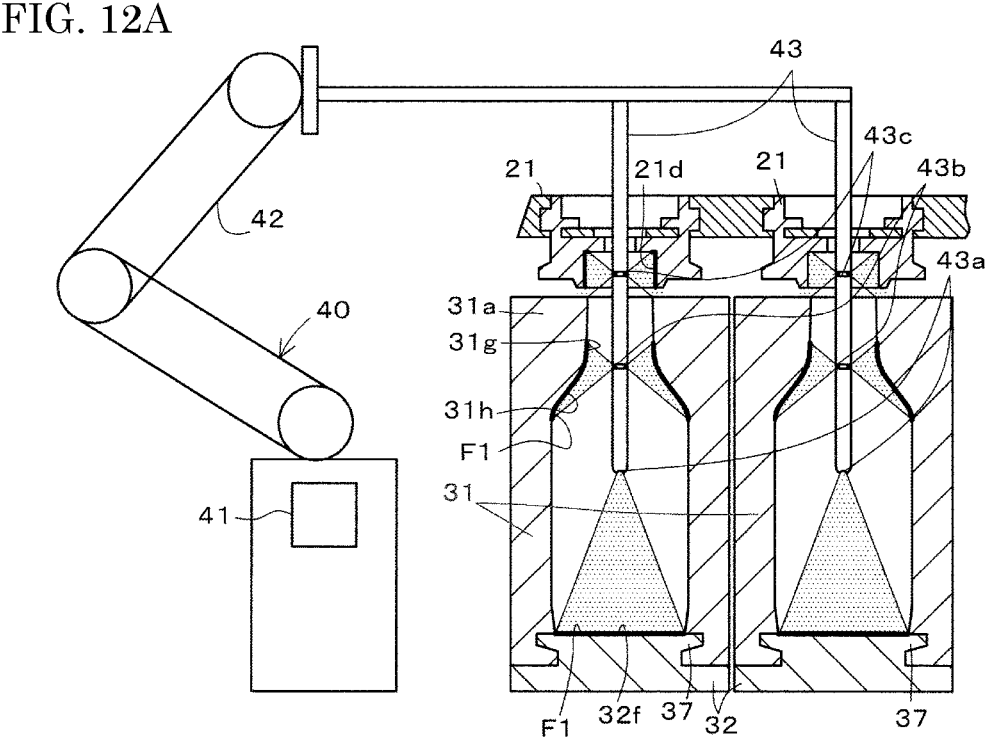
The second modification example
FIG. 12B
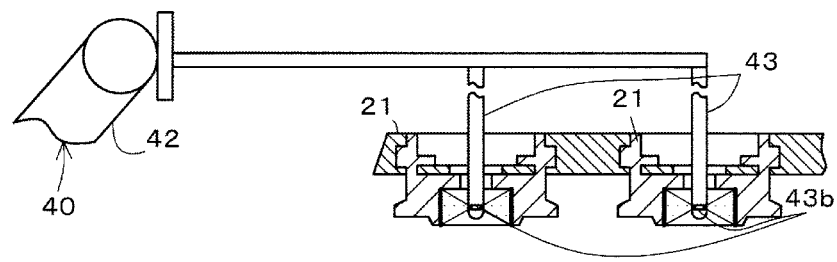
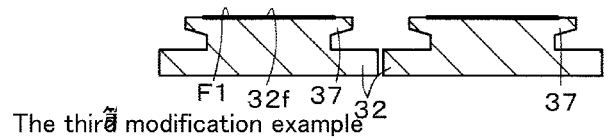
The third modification example The fourth modification example ial Application Publication No. 2009-538818

DEVICE FOR APPLYING RELEASE AGENT TO GLASS BOTTLE FINISHING MOLD, METHOD FOR APPLYING RELEASE AGENT TO GLASS BOTTLE FINISHING MOLD, DEVICE FOR MANUFACTURING GLASS BOTTLE, AND METHOD FOR MANUFACTURING GLASS BOTTLE

TECHNICAL FIELD

This invention is related to the application equipment for applying the mold release lubricant to glass bottle blow forming molds, a method of applying a mold release lubricant to one or more glass bottle blow forming molds (one or more blow molds and bottom molds), glass bottle manufacturing equipment and glass bottle manufacturing method.

BACKGROUND ART

In the glass bottle manufacturing process, typically a gob (a lump of molten glass) is formed into a parison using a blank mold. Next, the parison is transferred to the blow mold, and final forming is carried out by using compressed air to expand the parison inside the blow mold comprising the bottom mold attached to the bottom. This completes the formation of a glass bottle. High mold releasability is required of the blow mold and the bottom mold, thus the application of the mold release lubricant is critical. As such, the mold release lubricant must be applied regularly, for example, once every 20 minutes, to the inner surface of a mold to prevent a decline in the mold releasability. An example of a structure for the application of the mold release lubricant can be seen in the structure shown in Patent Literature 1.

PRIOR ART

Patent Literature

Patent Documents 1: Japanese Translation of PCT International Application Publication No. 2009-538818

SUMMARY OF THE INVENTION

Problem to be Solved by the Invention

With the blow mold and the bottom mold, if mold releasability declines due to an insufficient mold release lubricant, the glass bottle is subjected to significant load when the split mold of the blow mold is opened, which can cause cracks in the glass bottle. As such cracks can cause the glass bottle to break, this can result in significant losses related to reexamining products prior to crack formation and the disposal of cracked products.

The mold release lubricant application work to prevent the occurrence of cracks is carried out in between bottle formation without stopping the bottle manufacturing equipment, which operates at high speed. As such, if conducting a manual work of applying the mold release lubricant, there can be a significant competency gap depending on workers due to the difficulty of application work training. This competency gap raises concerns about changes in glass bottle quality. Depending on conditions, it may be necessary to stop the bottle manufacturing equipment to carry out the mold release lubricant application.

Furthermore, a work for applying the mold release lubricant to the blow mold and the bottom mold can involve the application of the mold release lubricant in multiple locations depending on the structure of the glass bottle. Furthermore, as normally the blow mold is located at the end of a conveyor that transports the products, the application of the mold release lubricant is carried out under a high-temperature work environment therefore, the manual work can be a significant burden on workers.

Conversely, there is also an application device of mold release lubricant disclosed in Patent Literature 1. This application device of mold release lubricant comprises a movable spray nozzle to form a uniform oil coating film on an entire surface of the mold cavity.

However, mold release lubricant required on the inner surface of the blow mold is not uniform, meaning the above-mentioned application device of mold release lubricant cannot carry out the work of applying mold release lubricant suitable for the characteristics of this type of the blow mold.

This invention is conceived in light of the abovementioned circumstances with the goal of eliminating the need for the manual work of applying the mold release lubricant to the blow molds and the bottom molds by workers, and reducing a burden of workers involved in the work of applying mold release lubricant as well as increasing safety of workers during the mold release lubricant application, reducing downtime during a glass bottle formation associated with the work of applying mold release lubricant, reducing changes of positions to which the mold release lubricant is applied or variations in applying quantity of the mold release lubricant for the blow molds, and furthermore, contributing to a glass bottle quality stabilization by providing a structure suitable for applying the mold release lubricant to the blow molds.

Means to Solve the Problem (1) As a means to solve the problem described above, an application equipment for applying a mold release lubricant to one or more glass bottle blow forming molds concerning one aspect of this invention is structured so that the application equipment apply the mold release lubricant to at least either a part of the blow mold forming surfaces provided on the blow molds, or the entire surfaces of the bottom mold forming surfaces provided on the bottom molds located in the lower part of this blow molds, or both.

With this structure, the application of mold release lubricant to the blow molds and the bottom molds by the application equipment. As a result, the need for the manual work of applying the mold release lubricant to the blow molds and the bottom molds is eliminated, enabling to reduce a burden of workers involved in the glass bottle manufacturing while also increasing safety of workers during the application of mold release lubricant. Furthermore, achieving rapid work of applying the mold release lubricant via automatic operations enables to reduce downtime of the glass bottle formation associated with the application. When compared to the manual work of applying the mold release lubricant, the work of applying the mold release lubricant via the application equipment enables to reduce changes of locations to which the mold release lubricant is applied or variations in applying quantity of mold release lubricant to the blow molds and the bottom molds. Furthermore, the mold release lubricant is applied to, at least either a part of the blow mold forming surfaces provided on the blow molds, or the entire surfaces of the bottom mold forming surfaces provided on the bottom molds located in the lower part of this blow molds, or both. With this structure, it is possible to apply the mold release lubricant in locations of the blow molds particularly requiring mold releasability while minimizing the application of the mold release lubricant in locations with no particular need. As this can prevent the negative impacts of excessive mold release lubricant application on the glass bottles, this achieves a structure suitable for the mold release lubricant application to the blow molds that can contribute to glass bottle quality stabilization.

(2) The application equipment for applying the mold release lubricant comprises one or more nozzles for spraying the mold release lubricant and the blow mold forming surfaces comprise a neck area forming surface to form a neck area of the glass bottle, a shoulder area forming surface located below the neck area forming surface to form the shoulder area of the glass bottle, and engraved area forming surface to form an engraved area that is located below the shoulder area forming surface and provided on a part of a body area forming surface to form a body area of the glass bottle, having an uneven shape with respect to the body area of the glass bottle. One or more nozzles may be structured so as to apply the mold release lubricant to, at least one or more from the neck area forming surface, the shoulder area forming surface, the engraved area forming surface and an opposing surface of the blow mold, which is facing a finish mold and provided adjacent to the neck area forming surface, as well as to the entire surface of the bottom mold forming surface.

With this structure, the mold release lubricant is applied to the entire surface of the bottom mold forming surface as well as to, at least one or more from the neck area forming surface, the shoulder area forming surface, engraved area forming surface, and the opposing surface facing the finish mold. Therefore, using this structure, it is possible to apply the mold release lubricant to the entire surface of the bottom mold forming surface, as well as to locations of the blow mold that particularly require mold releasability, more certainly.

(3) In the application equipment, one or more nozzles are structured so that it applies the mold release lubricant to the opposing surface of the blow mold, which is facing the finish mold and provided adjacent to the neck area forming surface, as well as to the neck area forming surface.

With this structure, the mold release lubricant can be applied to the opposing surface facing the finish mold and the neck area forming surface, which prevents the significant burden on the boundary area between the finish and the neck area of the glass bottle, which can prevent cracking in the boundary area between the finish and the neck area. As the result, this structure allows mold release lubricant to be applied more accurately to locations of the blow mold that particularly require mold releasability, while cracking can be prevented in the boundary area between the finish and the neck area.

(4) In the application equipment, one or more nozzles comprise a multidirectional nozzle that sprays the mold release lubricant in a plurality of different directions. The multidirectional nozzle may be structured so as to apply the mold release lubricant to at least one or more from the neck area forming surface, the shoulder area forming surface, the engraved area forming surface, and the opposing surface of the blow mold, which is facing the finish mold and provided adjacent to the neck part forming surface, as well as to the entire surface of the bottom mold forming surface.

With this structure, the work of applying the mold release lubricant can be carried out rapidly. Furthermore, the mold release lubricant is applied from spray holes located at different locations of the nozzle to a plurality of locations, which are at least one or more from the neck area forming surface, the shoulder area forming surface, engraved area forming surface, and the opposing surface of the blow mold, facing the finish mold, as well as to the entire surface of the bottom mold forming surface. As a result, unlike a structure having a single directional nozzle, through which mold release lubricant is applied to at least one or more from the neck area forming surface, the shoulder area forming surface, engraved area forming surface, and the opposing surface of the blow mold, which is facing the finish mold, as well as to the entire surface of the bottom mold forming surface, the structure eliminates the need for an operation to change the nozzle direction during the mold release lubricant application, which can reduce changes in locations of the mold release lubricant application and variations in applying quantity, thereby contributing to the glass bottle quality stabilization.

(5) The application equipment may be structured so that the mold release lubricant is applied in a state that one or more pairs of split molds of the blow molds are closed.

Using this structure, it is possible to apply the mold release lubricant while maintaining more uniform a distance between locations to which the mold release lubricant is applied among each area inside the blow mold, and the nozzle. Furthermore, it is possible to prevent the mold release lubricant from dispersing outside the blow molds.

(6) The application equipment may be structured so that the mold release lubricant is applied when a parison is not inserted into the blow mold.

With this structure, it is possible to prevent direct adhesion of the mold release lubricant on a parison applied from the application equipment to the blow mold.

(7) The application equipment may be structured so that the mold release lubricant is applied to sliding surface of the bottom mold, which is between the blow mold and the bottom mold when the pair of split molds of the blow mold is opened.

With this structure, the application equipment can apply the mold release lubricant to the sliding surface between the blow mold and the bottom mold. This results in smooth sliding operation between the blow mold and the bottom mold, making it possible to prevent the excessive force acting on the glass bottle formed in the blow mold.

(8) The application equipment may be structured so that the mold release lubricant is applied to the finish molds and the blow molds simultaneously by applying the mold release lubricant to the blow molds when the finish molds are located above the blow molds.

With this structure, the application equipment can also apply the mold release lubricant to the finish molds when applying mold release lubricant to the blow molds. Also, with this structure, it is possible to certainly prevent adhesion of the mold release lubricant, which is applied from the application equipment to the finish molds, to locations located below a blank mold such as a plunger where adhesion of mold release lubricant is not favorable. This can prevent occurrence of inner contamination and dirt of a parison, in other words, as this can prevent the occurrence of inner contamination and dirt of a glass bottle, as a result, it is possible to prevent a decline in the strength of a glass bottle. Also, it is possible to prevent a glass forming defects due to insufficient solidification resulting from a decline in contact between the plunger and the parison caused by the mold release lubricant adhered to the plunger when, for example, press blow forming (PB) or narrow neck press blow forming (NNPB) is conducted.

(9) In certain variations, the application equipment may be structured so that the mold release lubricant is applied in a state that a gap is provided between the blow mold and the finish mold, the mold release lubricant is simultaneously applied to the opposing surfaces, facing the finish mold and the blow mold each other.

With this structure, mold release lubricant can be applied to the blow mold, as well as to locations of the finish mold that slide with the blank molds and the finish molds. Furthermore, if the structure applies the mold release lubricant to the opposing surfaces, facing the finish mold and the blow mold, the finish mold and the blow mold itself serve as a fence that can effectively prevent mold release lubricant applied by the application equipment from dispersing onto locations where application is not required.

(10) The application equipment may be configured so that in a swab cycle (ON/OFF of machine operations can be set arbitrarily) that no gob is supplied to the glass bottle manufacturing equipment comprising the blow molds, which is different from regular glass bottle manufacturing cycle (a gob is supplied at regular intervals to repeat the operation required for the glass bottle formation), the mold release lubricant is applied to the blow molds and the finish molds when the finish molds are located above the blow mold.

With this structure, it is possible to prevent direct adhesion of mold release lubricant on a parison applied from the application equipment to the blow molds. Furthermore, the application equipment can also apply the mold release lubricant to the finish molds when applying the mold release lubricant to the blow molds. With this structure, it is possible to prevent adhesion of the mold release lubricant, which is applied from the application equipment to the finish molds, to locations located below a blank mold such as the plunger where the adhesion of mold release lubricant is not favorable. This can prevent the occurrence of inner contamination and dirt of a parison, in other words, as this can prevent the occurrence of inner contamination and dirt of a glass bottle, as a result, it is possible to prevent a decline in the strength of a glass bottle. It is also possible to prevent a glass forming defects due to insufficient solidification resulting from a decline in contact between the plunger and the parison caused by the mold release lubricant adhering to the plunger when, for example, press blow forming (PB) or narrow neck press blow forming (NNPB) is conducted.

(11) It is preferable for the application equipment to comprise an application portion for applying the mold release lubricant to the blow molds, and a control unit for controlling operations of the application portion.

With this structure, the control unit can control actual mold release lubricant applying operations by controlling the application portion.

(12) The application portion preferably is configured so as to have its position changed with respect to the blow molds by a position changing mechanism, and the control unit preferably comprises the operations of the position changing mechanism and a control portion that controls a supply of the mold release lubricant from the application portion.

With this structure, the control unit can more accurately apply the mold release lubricant to the desired locations on the inner surface of the blow molds while changing locations to apply mold release lubricant by operating the position changing mechanism.

(13) As a means to solve the problem, the method of applying the mold release lubricant to blow molds for manufacturing glass bottles concerning one aspect of this invention applies mold release lubricant to at least either a part of the blow mold forming surfaces provided on the blow molds, or the entire surfaces of the bottom mold forming surfaces provided on the bottom molds located in the lower part of this blow molds, or both.

(14) Furthermore, as a means to solve the problem, the glass bottle manufacturing equipment concerning one aspect of this invention comprises the application equipment for applying the mold release lubricant.

(15) Furthermore, as a means to solve this problem, the method of manufacturing glass bottle concerning one aspect of this invention comprises a mold release lubricant application step for applying the mold release lubricant, to at least either a part of the blow mold forming surfaces provided on the blow molds, or the entire surfaces of the bottom mold forming surfaces provided on the bottom molds located below the blow molds, or both.

Based on the structure set forth in the aforementioned (13) to (15), carrying out the mold release lubricant application for the blow molds and the bottom molds by using the application equipment eliminates the need for the manual work of applying the mold release lubricant to the blow molds and the bottom molds by workers, enabling to reduce a burden of workers involved in glass bottle manufacturing while increasing safety of workers during the mold release lubricant application. Furthermore, achieving rapid mold release lubricant application via the automatic operations enables to reduce downtime during the glass bottle formation associated with mold release lubricant application. Further, when compared to the manual work of applying the mold release lubricant, the work with the application equipment enables to reduce in changes of locations to which mold release lubricant is applied or variations in applying quantity of the mold release lubricant to the blow molds and the bottom molds. Furthermore, the mold release lubricant is applied to, at least either a part of the blow mold forming surfaces provided on the blow mold, or the entire surfaces of the bottom mold forming surfaces provided on the bottom molds located below this blow molds, or both. With this structure, it is possible to apply sufficient mold release lubricant in locations of the blow molds particularly requiring mold releasability while minimizing the application of the mold release lubricant in locations with no particular need. As this can prevent the negative impacts of excessive mold release lubricant application on glass bottles, this achieves a structure suitable for the mold release lubricant application to the blow molds that can contribute to glass bottle quality stabilization.

Effect of the Invention

This invention eliminates the need for the manual work of applying the mold release lubricant by workers, thereby enabling to reduce a burden of workers related to glass bottle manufacturing while also increasing safety of workers during the mold release lubricant application. Furthermore, this invention can reduce the glass bottle formation downtime associated with the mold release lubricant application work, which can reduce changes in locations of mold release lubricant application to which the mold release lubricant is applied and variations in applying quantity for the blow molds, achieves a structure that provides appropriate mold release lubricant application to the blow molds thus, as a result, can contribute to the glass bottle quality stabilization.

BRIEF DESCRIPTION OF THE DRAWINGS

FIG. 2 is a schematic plain view of the glass bottle manufacturing equipment, with partial omission.

FIG. 3 is a schematic side view showing an application equipment, finish molds, and blow molds and the like.

FIG. 5A and FIG. 5B are explanatory diagram of an example of procedure of glass bottle forming.

FIG. 12A is a partial cross-sectional side view showing main components of an example of a second modification of the present invention.

FIG. 12B is a partial cross-sectional side view showing main components of an example of a third modification of the present invention.

DESCRIPTION OF EMBODIMENTS

Hereinafter, an embodiment of the present invention will be described with reference to the drawings.

Figure 1:
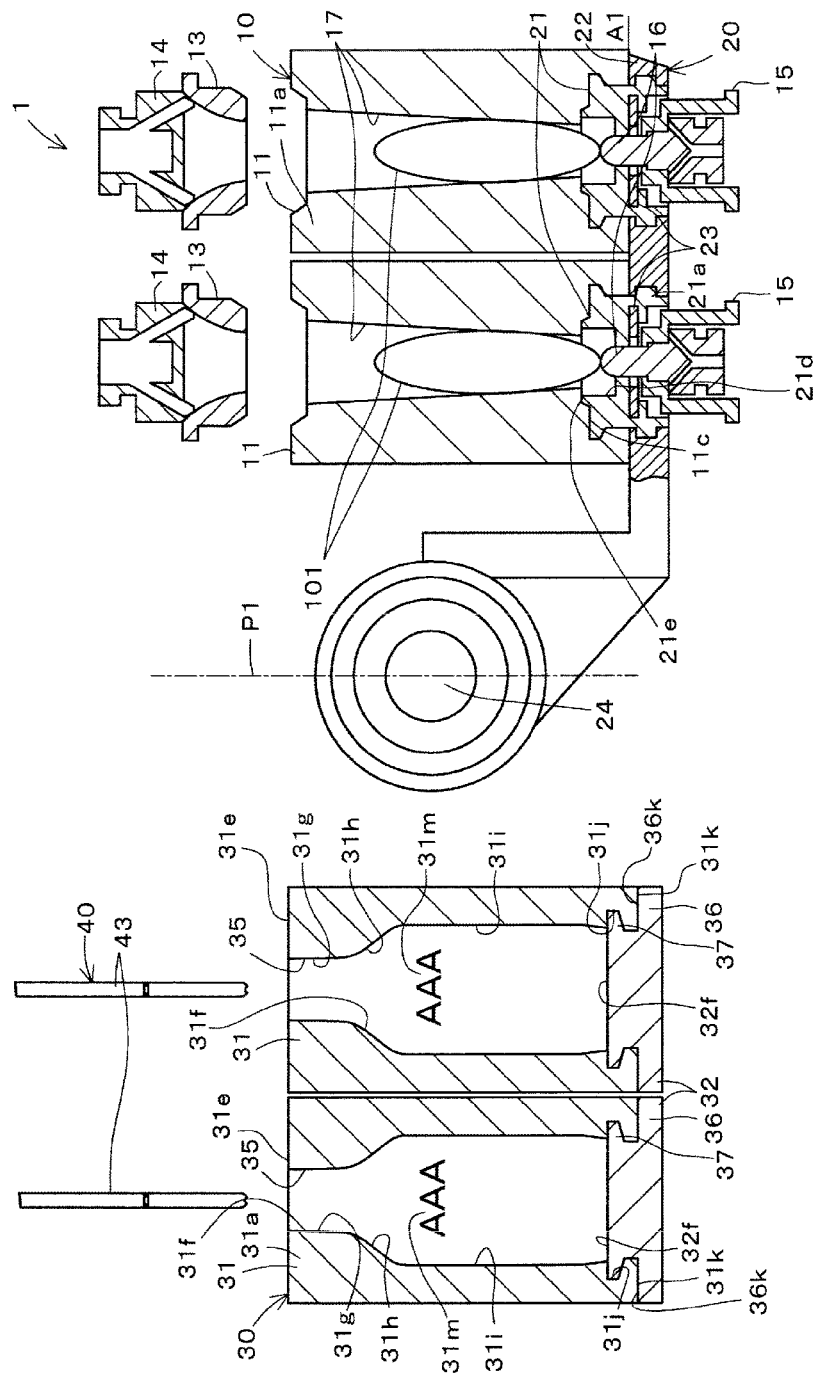
FIG. 1 is a schematic side view of glass bottle manufacturing equipment according to one embodiment of the present invention showing a partial cross-section view with partial omission.
Figure 3:
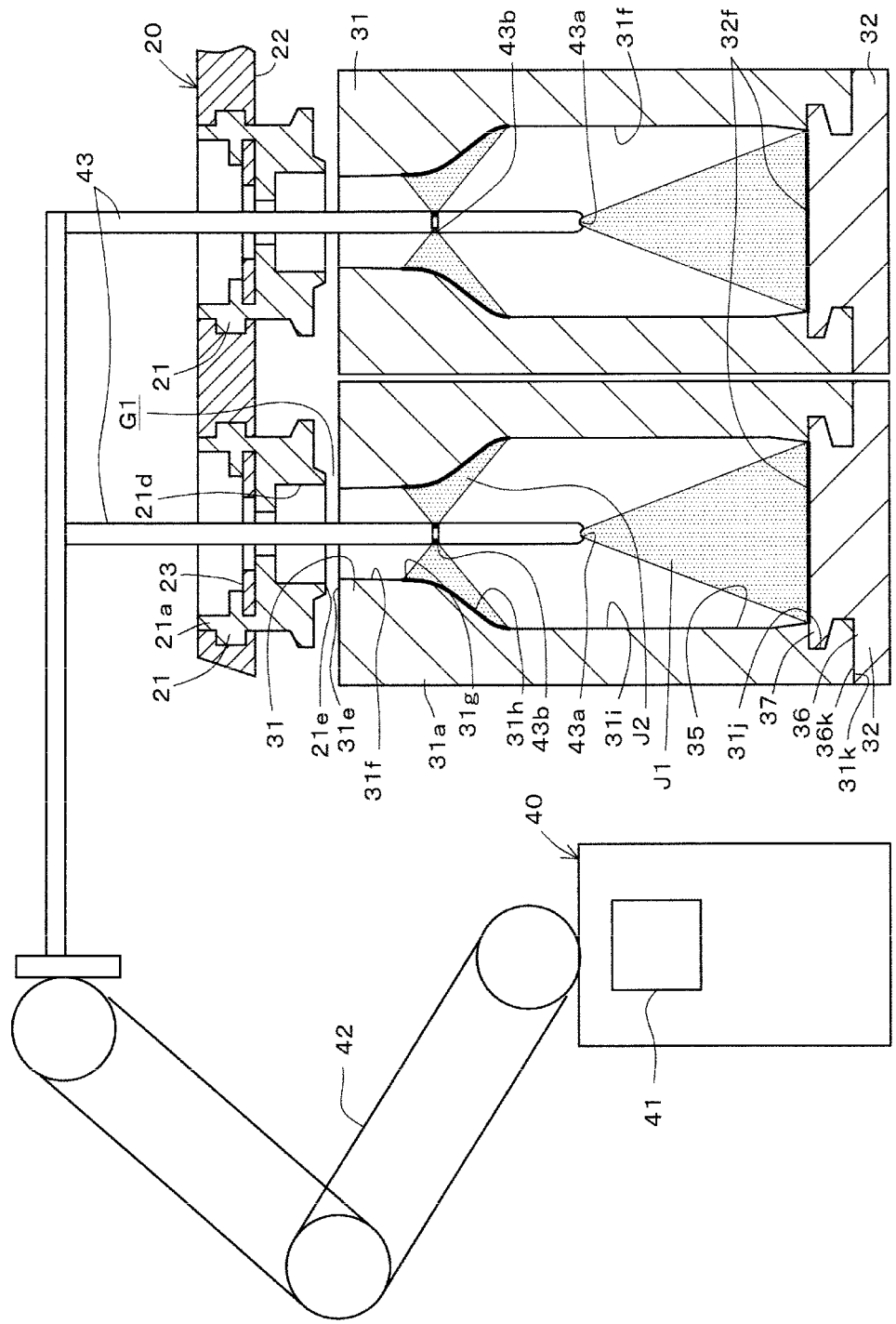
Figure 4A:
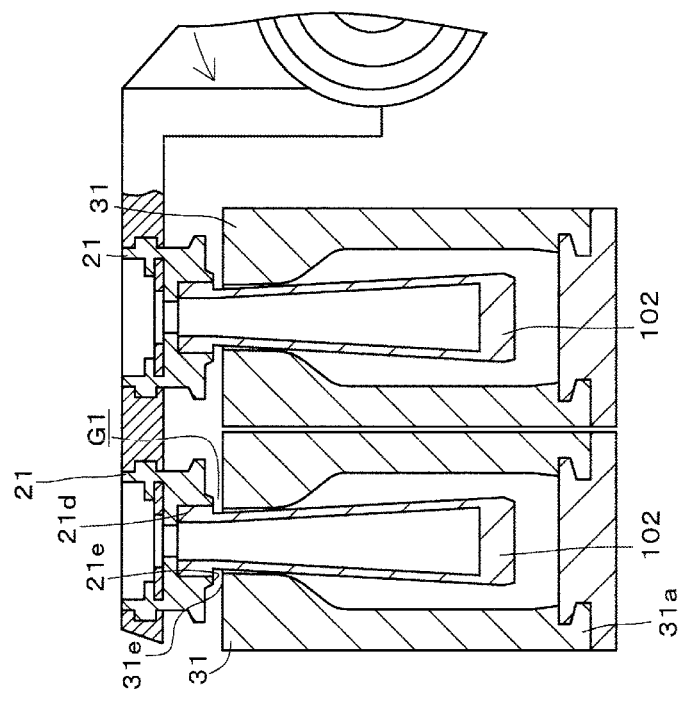
FIG. 4A and FIG. 4B are explanatory diagrams of an example of procedure of glass bottle forming.
Figure 4B:
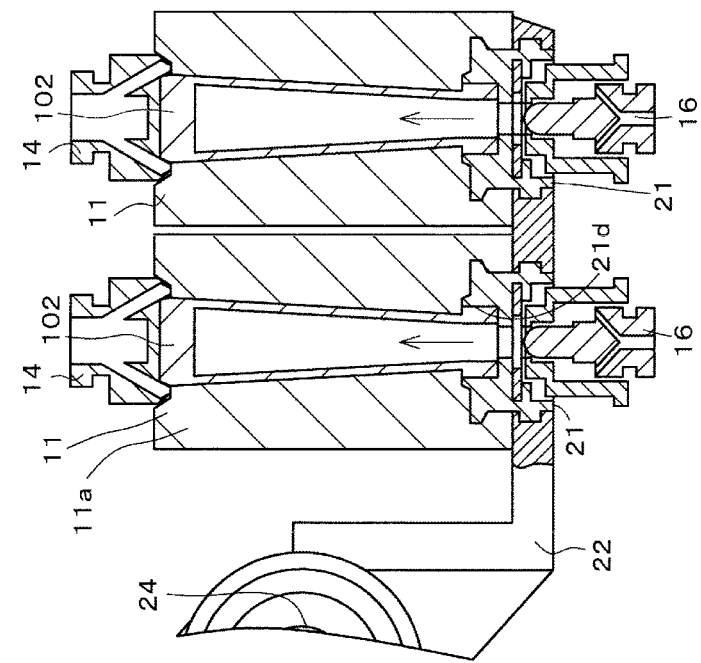

FIG. 1 is a schematic side view of the glass bottle manufacturing equipment according to one embodiment of the present invention showing a partial cross-section with partial omission. FIG. 2 is a schematic plain view of the glass bottle manufacturing equipment, with partial omission. FIG. 3 is a schematic side view showing the application equipment 40, finish molds 21, and blow molds 31 and the like. FIG. 4A and FIG. 4B are explanatory diagrams of an example of a process of glass bottle forming. FIG. 5A and FIG. 5B are explanatory diagrams of a process of glass bottle forming.

Referencing FIG. 1 to FIG. 5B, glass bottle manufacturing equipment 1 (hereinafter, simply referred to as manufacturing equipment 1) employs a blow and blow process to form a gob 101 (molten chunk of glass) into a parison 102, and further form the parison 102 into a glass bottle 103. To the manufacturing equipment 1, the gob 101 is supplied from a gob supply mechanism (not shown). In this embodiment of the invention, the manufacturing equipment 1 can simultaneously form two gobs 101 into glass bottles 103. The manufacturing equipment 1 can also simultaneously form one, three, or four gobs 101 into glass bottles 103, with the number that may be formed simultaneously not limited to two.

Manufacturing equipment 1 comprises one or more blank mold portions 10, finish mold portions 20, and blow mold portions 30 and a mold release lubricant application equipment 40.

The blank mold portion 10 is used in conjunction with the finish mold portion 20 to form the gob 101 into the parison 102. The blank mold portion 10 is supplied (filled) the gob 101 from the gob supply mechanism.

The blank mold portion 10 comprises one or more blank molds 11, funnels 13, baffles 14, thimbles 15 and plungers 16, and a blank mold opening/closing mechanism (not shown).

The present embodiment of the invention comprises two blank molds 11. The blank mold 11 comprises a pair of split molds 11a and 11b, which faces each other from side to side. Combining these split molds 11a and 11b forms a cavity 17 in which the gob 101 to be inserted. Opening and closing of the pair of split molds 11a and 11b of each blank mold is operated by the blank mold opening/closing mechanism (not shown).

A lower surface 11c of the blank mold 11 is formed in a shape concaved upward in the location corresponding to the cavity 17, and a finish mold 21 of the finish portion 20 is located in this concaved area. The finish mold portion 20 is provided to form a finish area 103a of the glass bottle 103 from the gob 101. Furthermore, the finish mold portion 20 is to transfer the parison 102 formed via the blank mold 11 to the blow mold portion 30.

The finish mold portion 20 comprises one or more finish molds 21, a finish mold holder 22 supporting the finish molds 21, a rotary shaft 24 to which the finish mold holder 22 is attached and a finish mold opening/closing mechanism (not shown).

The embodiment of the invention comprises two finish molds 21. A part of the finish mold 21 including an opposing surface 21e, is fitted to a fitting surface that is formed on the lower surface 11c of the blank mold 11. When the finish molds 21 is located in the blank mold 11 side, the plunger 16 is located so as to seal the opening of the finish mold 21. The finish mold 21 comprises a pair of half cylindrical shaped split molds 21a and 21b facing each other from side to side, whereby the split molds 21a and 21b are combined to form a cylindrical finish mold 21. The split molds 21a and 21b can be switched between open position when the two molds are separated and closed position when the two molds are fitted together as necessary by an opening/closing mechanism (not shown). A guide ring 23 is embedded in the axial middle part of the finish mold 21. A spiral shaped groove or an uneven area is formed in a finish forming surface 21d. Pressing the gob 101 into the finish forming surface 21d forms the finish area 103a.

The upper surface facing the lower surface 11c (lower surface) of the blank mold 11 of the finish mold 21 comprises the opposing surface 21e. In this embodiment of the invention, the opposing surface 21e is substantially a flat surface. The finish mold 21 is supported by a finish mold holder 22. In the present embodiment of this invention, the finish mold holder 22 is the L-shaped arm member. The proximal end of the finish mold holder 22 is attached to a rotary shaft 24 that extends horizontally, wherein the finish mold holder 22 and the finish molds 21 can rotate around the center of the rotary shaft 24 by a rotation mechanism (not shown). This rotating operation causes the finish molds 21 to travel back and forth between the position in the lower part of the blank molds 11 (position in FIG. 1) and the position in the upper part of the blow mold portion 30 (position in FIG. 3).

Returning to the explanation of the blank mold portion 10, the funnel 13 is cylindrical shaped that assists a progression of the gob 101 into the cavity 17. Furthermore, during a settle blow process, the funnel 13 operates in conjunction with the baffle 14 to close the upper end of the blank mold 11. After this closing operation, compressed air is injected ventilating hole of the baffle 14 towards the gob 101 inside the cavity 17.

The plunger 16 is structured so that compressed air supplied from a compressor (not shown) can be blown towards the gob 101 in the cavity 17. The plunger 16 is guided by the cylindrical thimble 15 and can be movable upward and downward. The plunger 16 is exposed to the blank mold 11 side through the opening of the finish mold 21. Through this structure, the plunger 16 can directly contact the gob 101 that reaches the inside of the finish mold 21 to form an inner surface.

In the present embodiment, the blow mold portion 30 is located opposing to the blank mold portion 10 with the rotary shaft 24 to which the finish mold holder 22 is attached in between. Furthermore, in the present embodiment, when the rotary shaft 24 to which the mold holder 22 is attached serves as the reference, a space from the imaginary vertical face P1 passing through the rotary shaft 24 to the blank mold portion 10 side is referred to as "the blank mold side", and a space from the imaginary vertical face P1 to the blow mold portion 30 side is referred to as "the blow mold side".

The blow mold portion 30 comprises one or more blow molds 31, bottom molds 32 located in the lower part of the blow molds 31 and blow heads 34, and a finish mold opening/closing mechanism (not shown). The blow molds 31 and the bottom molds 32 comprise the glass bottle blow forming mold of the embodiment of this invention.

The present embodiment of this invention comprises two parts of the blow molds 31. The blow mold 31 forms the glass bottle 103 by working in conjunction with the bottom mold 32 to form the parison 102 parts excluding the finish area 103a. The blow mold 31 comprises a pair of split molds 31a and 31b, which faces each other from side to side. Combining the split molds 31a and 31b forms the blow mold 31.

The top surface of the blow mold 31 has an opposing surface 31e facing the opposing surface 21e of the finish mold 21. The opposing surface 31e is a substantially flat surface formed around the opening of the blow mold 31. The opposing surface 31e is structured to a surface of the blow mold 31, which faces the finish mold 21 and provided adjacent to the neck area forming surface 31g of the blow mold forming surfaces 31f described below. Furthermore, the inner surface of the blow mold 31 form a cavity 35 in which parts of the parison 102 excluding the finish area 103a is inserted. In the specifications, the inner surface of the blow mold 31 forming the cavity 35 is referred to as blow mold forming surfaces 31f. On the blow mold forming surfaces 31f of the blow mold 31 and the bottom mold forming surface 32f of the bottom mold 32 (described below), which comprise the area in which the parison 102 is formed into the glass bottle 103, coating layer is formed by carbon coating and the like. Furthermore, mold release lubricant is applied regularly to the inner surface by the application equipment 40.

The inner surface of the blow mold 31 comprises the blow mold forming surfaces 31f and a fitting surface 31j in the lower part of the blow mold forming surfaces 31f.

The blow mold forming surfaces 31f comprises a neck area forming surface 31g that is adjacent to the opposing surface 31e for forming the neck area 103b of the glass bottle 103, a shoulder area forming surface 31h located below the neck area forming surface 31g for forming the shoulder area 103c of the glass bottle 103, and a body area forming surface 31i located below the shoulder area forming surface 31h for forming a body area 103d of the glass bottle 103.

The neck area forming surface 31g is cylindrical-shaped with a diameter that is, for example, smaller than the diameter of the body area forming surface 31i. In this embodiment of the invention, the neck area forming surface 31g is located on the upper side of the blow mold forming surfaces 31f.

The shoulder area forming surface 31h is a surface connecting the neck area forming surface 31g and the body area forming surface 31i. On the shoulder area forming surface 31h, the upper end continuing to the neck area forming surface 31g is formed of a curved surface with the diameter becoming larger as it approaches the bottom and is formed of a convex toward the center of the cavity 35 when viewed from the side. Furthermore, the intermediate area of the shoulder area forming surface 31h is tapered shape with the diameter becoming larger as it goes downward. Furthermore, of the shoulder area forming surfaces 31h, the lower end continuing to the body area forming surface 31i is formed of a curved surface with the diameter becoming larger as it goes downward and is formed of a convex toward the outside of the cavity 35 when viewed from the side. In this structure, the shoulder area forming surface 31h is structured to form a part of the glass bottle 103 from R area of the base of the neck area 103b to the area approaching the body area 103d.

The body area forming surface 31i is a cylindrical surface with a substantially uniform diameter wherein the lower part of the body area forming surface 31i is set to be slightly smaller than the intermediate part of the body area forming surface 31i in the diameter. Of the body part forming surfaces 31i, the base part is a hem forming surface as well. The lower part of the body area forming surface 31i abuts on the bottom mold forming surface 32f described below of the bottom mold 32. A fitting surface 31j is located at the base of the body area forming surface 31i. Furthermore, on a part of the body area forming surface 31i, an engraved area forming surface 31m for forming the engraved area with an uneven surface with respect to the body area 103d of the glass bottle 103, is provided. The engraved area is formed as a letter or a pattern that is engraved so as to have an uneven shape on the surface of the body area 103d. The engraved area forming surface 31m is formed of the uneven shape for engraving the engraved area, formed as a letter or a pattern on the body part 103d, as well as is formed of the uneven shape suitable for the shape of the engraved area. FIG. 1 shows a shape of the engraved area forming surface 31m for forming the engraved area structured with the character string "AAA" with respect to the body part 103d. Furthermore, the diagrams of the blow molds 31 displayed in other than FIG. 1 omit the depiction of the engraved area forming surface 31m. Furthermore, this embodiment of the invention describes an embodiment of the blow mold 31 in which the engraved area forming surface 31m is provided on the body area forming surface 31i but this invention is not limited to this embodiment. The invention may include an embodiment of the blow molds not comprising an engraved area forming surface.

The fitting surface 31j is structured as a part fitting to a convex area 37 described below the bottom mold 32. The fitting area 31j comprises an annular groove adjacent to the body area forming surface 31i and a cylindrical area connected from the annular groove to a flat sliding surface 31k, which serves as a base surface of the blow molds 31.

Two parts of the bottom molds 32 are provided for corresponding to the two blow molds 31. The bottom molds 32 are located at the base of the blow molds 31 and work in conjunction with the blow molds 31 to form cavities 35.

The bottom mold 32 comprises a base portion 36 and a convex portion 37 that protrudes from the base portion 36.

A base portion 36 is a block shape area located below the blow mold 31. The upper surface of the base portion 36 comprises sliding surface 36k, which slidably contact the sliding surface 31k of the blow mold 31. The sliding surface 36k is a flat surface formed at the base of the blow mold 31 and that runs parallel to the sliding surface 31k. When the blow mold 31 is opened or closed, the sliding surface 31k slides with respect to the stationary sliding surface 36k.

The convex portion 37 fits to the fitting surface 31j of the blow mold 31 and comprises the bottom mold forming surface 32f.

The outer circumference of the convex portion 37 is formed in a shape that corresponds to the shape of the fitting surface 31j of the blow mold 31. The proximal end connecting to the base portion 36 forms a cylindrical shape and the tip side area forms a disk shape that bulges radially outward from proximal end.

The bottom mold forming surface 32f is formed on the top surface of the convex portion 37. In the present embodiment, the bottom mold forming surface 32f is formed on the entire surface of the top face of the convex portion 37 that forms in conjunction with the blow mold 31, to form the cavity 35. In other words, the bottom mold forming surface 32f is structured as a part of the top surface of the convex portion 37 that is exposed to the cavity 35. Furthermore, the inner surface forming the cavity 35 consists of the blow mold forming surfaces 31f and the bottom mold forming surface 32f. In the present embodiment, the bottom mold forming surface 32f is formed in circular shape and the outer peripheral edge of this circular shape contacts the lower end area of the body area forming surface 31i of the blow mold forming surfaces 31f. The bottom mold forming surface 32f is formed in a shape corresponding to the shape of the lower part of the glass bottle 103 and is formed as a flat surface or in a shape with the center rising upward.

According to the structure described above, when the pair of split molds 31a and 31b of the blow mold 31 is closed, the convex portion 37 of the bottom mold 32 is fitted to the fitting surface 31j of the blow mold 31, and the sliding surface 31k of the blow mold 31 is in contact with the sliding surface 36k of the bottom mold 32. Furthermore, when the pair of split molds 31a and 31b of the blow mold 31 is opened or closed, the sliding surface 31k of the blow mold 31 slides with respect to the sliding surface 36k of the bottom mold 32. For this reason, lubricant (mold release lubricant) is applied between the sliding surface 36k of the bottom mold 32. The pair of split molds 31a and 31b of the blow mold 31 is opened and closed by the blow mold opening and closing mechanism.

The blow head 34 is provided for supplying compressed air from a compressor or other compressed air supply source (not shown) into the parison 102. The blow head 34 is formed in a shape of a hollowed block and includes a nozzle for blowing air into the center. The blow head 34 is structured to be movable to the position where it's located above the opposing surface 31e of the blow mold 31, and the position where it's retreated from the opposing surface 31e of the blow mold 31 via a movement mechanism (not shown).

Below is an explanation of the key points of forming process of the glass bottle 103 with the manufacturing equipment 1 comprising the above configuration. As shown in FIG. 1, as for a rough forming process (parison forming) of the glass bottle 103 formation process, first of all, the gobs 101 are supplied into each cavities 17 of blank molds 11 to which the funnels 13 are attached. Afterwards, the baffles 14 are attached to the funnels 13. Next, conducting settle-blow process in which compressed air is injected to the cavities 17 from the baffles 14 presses the gobs 101 against the finish molds 21 to be deformed. This forms the finish area 103a.

Next, as shown in FIG. 4A, the plungers 16 descend in a state that an upper end of the blank molds 11 are closed with the baffles 14. From the bottom of the plungers 16, compressed air passes through the inside of the plungers 16 and is blown towards the inside of the gobs 101 in the direction of arrows as shown. In other words, a counter blow process is carried out. As a result, the gobs 101 are pressed against the blank molds 11, which form cavities inside the gobs 101. Through this type of process (the rough forming process among the glass bottle 103 forming process), the parisons 102 are formed.

After completion of the preceding rough forming process, next parisons 102 formed by the blank molds 11 are transferred to the blow mold portion 30. As to transfer of the parisons 102, first the baffles 14 are removed from the blank molds 11, then the blank mold opening/closing mechanism opens the two pairs of split molds 11a and 11b of the blank molds. Then, the rotary shaft 24 to which the finish mold holder 22 is attached, rotates. Through this process, the finish molds 21 are moved from the lower part of the blank molds 11 (blank molds 11 side) to the upper part of the blow molds 31 as shown in FIG. 4B. At this time, the pairs of split molds 31a and 31b of the blow mold are open. Furthermore, when the pair of split mold 31a and 31b of the blow mold 31 is closed, a slight gap G1 of approximately 1 mm is set to be formed between the opposing surface 21e of the finish mold 21 and the opposing surface 31e of the blow mold 31. Through this operation, areas other than the finish area of the parison 102 are located inside the blow molds 31.

Next, the pairs of split molds 31a and 31b of the blow mold 31 are closed by the blow mold opening/closing mechanism (not shown). Next, opening the pairs of split molds 21a and 21b of the finish molds 21 by the finish mold opening/closing mechanism (not shown) results in the parisons 102 being dropped slightly into and received by the opposing surfaces 31e of the blow molds 31 as shown in FIG. 5A. This completes the transfer of the parisons 102 to the blow mold portion 30. Furthermore, after the transfer of the parisons 102 is completed, a rotating operation of the rotary shaft 24 to which the finish mold holder 22 is attached, returns the finish molds 21 to the blank molds 11 side.

After completion of the parisons 102 transfer, blow mold forming process of the glass bottle 103 forming process is carried out. In other words, the blow mold forming process using the blow molds 31 to form the glass bottles 103 is carried out. Furthermore, in the glass bottle manufacturing method of this embodiment, this blow mold forming process comprises a forming step adopting blow molds 31 to form glass bottles 103. In the blow mold forming process, as shown in FIG. 5B, first the blow heads 34 move to the upper part of the blow molds 31 and finish areas 103a are covered with the blow heads 34. This blow heads 34 supply compressed air to the parisons 102 via built-in nozzles. This allows a final blow process to be carried out, which is causing the parisons 102 to be pressed against the forming surfaces 31f and 32f of the blow molds 31 and the bottom molds 32, as well as causing the space within the parisons 102 to expand. As the result, the glass bottles 103 are formed. After the glass bottles 103 are formed, the blow heads 34 retreat from the blow molds 31 and the pairs of split molds 31a and 31b of the blow molds are opened by the blow mold opening/closing mechanism. Then, the glass bottles 103 are removed from the blow molds 31 by a takeout arm (not shown).

Mold release lubricant is applied regularly to the inner surfaces of the cavities 35 of the blow molds 31 to ensure mold releasability (ease of release) from the parisons 102. The mold release lubricant is applied during the glass bottle 103 forming process. The application equipment 40 shown in FIG. 3 is used to apply this mold release lubricant.

An example of the mold release lubricant applied by the application equipment 40 is a mineral oil containing a solid lubricant made from graphite particles. In this embodiment, the application equipment 40 comprises an application equipment for applying the mold release lubricant to the glass bottle blow molds. Furthermore, in this embodiment, the application equipment 40 is configured to apply the mold release lubricant to at least either an area of the blow mold forming surfaces 31f provided on the blow molds 31, or the entire surfaces of the bottom mold forming surfaces 32f provided on the bottom molds 32, or both.

In this embodiment, the application equipment 40 is configured so as to apply the mold release lubricant to areas of the blow mold forming surfaces 31f provided on the blow molds 31, the entire surfaces of the bottom mold forming surfaces 32f provided on the bottom molds 32 located in the lower part of the blow molds 31, and the sliding surfaces 36k that slide with the blow molds 31 of the bottom molds 32. Furthermore, in this embodiment of the invention, during parison forming, as a reference position for a position A1 of the finish molds 21 (see FIG. 1; the lower side of blank mold 11) used for the application equipment 40 is configured to apply the mold release lubricant to the position away from the plungers 16 of the blank molds 11, in other words, to the finish molds 21 located in the upper part of the blow molds 31.

As shown in FIG. 3, the application equipment 40 comprises a control portion (control unit) 41, a position changing mechanism 42, a mold release lubricant supply mechanism (not shown) and two nozzles 43 for spraying the mold release lubricant.

The control portion 41 comprises a configuration for outputting a predetermined output signal based on a predetermined input signal and may be configured, for example, using a programmable controller (PLC). Furthermore, the control portion 41 may also be configured using a computer and the like, comprising a central processing unit (CPU), random access memory (RAM), and read only memory (ROM). Furthermore, the control portion 41 may also comprise a configuration that uses mechanical manipulation involving no electric circuit causes the nozzles 43 to spray the mold release lubricant as well as to changing positions of the nozzles 43.

The control portion 41 comprises a configuration so as to control a mechanism operation 42 (nozzles 43) and the amount of the mold release lubricant (amount to spray) supplied from spray holes 43a and 43b of the nozzles 43 to be described later. Control of the amount to spray to each location of the blow mold forming surfaces 31f and the bottom mold forming surface 32f (control including the spray area settings) can be carried out via control of the actual amount to spray from the nozzles 43 (spray pressure) or control of the rising and descending speed of the nozzles 43 with the amount to spray fixed, or control of the spray timing of the mold release lubricant from the nozzles 43. Needless to say, desired application can be achieved by controlling the ON/OFF setting of mold release lubricant from the nozzles 43.

The control portion 41 comprises a configuration so as to detect the open/closed status of one or more pairs of split molds 31a and 31b of the blow molds 31. For example, a sensor for detecting the opened/closed position of the pairs of split molds 31a and 31b are connected to the control portion 41, which may detect a state of opened/closed of the pairs of split molds 31a and 31b. Or, for example, a control circuit that controls operation of the pairs of split molds 31a and 31b are connected to the control portion 41, which may detect the state of open/closed of the split molds 31a and 31b, based on receipt of a signal from the above-mentioned control circuit. Or, for example, the control portion 41 may comprise a configuration so as to control the open/close operation of the pairs of split molds 31a and 31b. Or, the control portion 41 may comprise a configuration so as to be able to control components of the manufacturing equipment 1.

The position changing mechanism 42 is used to change the positions of the nozzles 43 with respect to the blow molds 31 and the finish molds 21 as well as to maintain the position of the nozzles 43. The position changing mechanism 42, for example, comprises a six-axis robot or other articulated robot. Furthermore, it is sufficient if the position changing mechanism 42, at least, may control insertion and removal of the nozzles 43 in and out of the cavities 35 of the blow molds 31, which is not limited to specific mechanism. Furthermore, the position changing mechanism 42 may be configured so as to be movable on the blow mold side of the glass bottle forming machine (IS machine) along each section.

The aforementioned mold release lubricant supply mechanism is used to supply the mold release lubricant to the nozzles 43 and, for example, comprises hoses, a pump and a control valve for transferring the mold release lubricant to the nozzles 43. Furthermore, the mold release lubricant supply mechanism is electrically connected to the control portion 41 and comprises a configuration that allows the control portion 41 to control the supply and stoppage of mold release lubricant to the nozzles 43.

The nozzles 43 are used to spray the mold release lubricant. The nozzle 43 is formed in a thin, long rod shape. The base end of the nozzle 43 is supported by the tips of the position changing mechanism 42. The nozzle 43 comprise a length that, at the very least, enables insertion into a location that horizontally faces the neck area forming surface 31g inside the cavity 35. In this embodiment of the invention, when the application equipment 40 sprays the mold release lubricant, the tip of the nozzle 43 are inserted up to a location that horizontally faces the body area forming surface 31i. The nozzle 43 may spray the mold release lubricant while moving in an upward direction or while moving in a downward direction or while in a static position after insertion into the cavity 35.

The nozzles 43 of this embodiment comprise a multidirectional nozzle structure enabling mold release lubricant spraying in multiple different directions. In other words, as the nozzles 43 for spraying the mold release lubricant, the application equipment 40 comprises a multidirectional nozzle capable of spraying the mold release lubricant in multiple different directions. Furthermore, the nozzles 43 offered as an example of a multidirectional nozzle in this embodiment are a two-directional nozzles capable of spraying the mold release lubricant in different directions respectively. More specifically, the nozzles 43 comprise a structure so as to spray the mold release lubricant along the horizontal direction sideways, as well as to spray the mold release lubricant along the vertical direction downward. The nozzles 43 comprise a structure of the first spray holes (application portion) 43a and the second spray holes (application portion) 43b.

The first spray holes 43a and the second spray holes 43b are respectively located at the tip side area and an intermediate area of the nozzle 43, and are formed by slits and the like, so as to spray the mold release lubricant. The first spray holes 43a spray the mold release lubricant in the axial direction of the blow mold 31, that is, in the present embodiment, in the first direction along the vertical direction (downward). On the other hand, the second spray holes 43b spray the mold release lubricant in a direction perpendicular to the axial direction of the blow molds 31, that is, in the present embodiment, in a second direction along the horizontal direction.

For example, the first spray holes 43a are located at the tip of the nozzle 43, and face the bottom mold forming surface 32f at the time of spraying the mold release lubricant. The mold release lubricant reaches the first spray holes 43a through a path (not shown) inside the nozzle 43, and is sprayed from the first spray holes 43a to the entire surface of the bottom mold forming surface 32f. Further, the second spray holes 43b are located in the upper part of the first spray holes 43a (a position advanced from the first spray holes 43a to the base end side of the nozzle 43), and, for example, around the center axis of the nozzle 43, a plurality of the second spray holes 43b are located on the outer peripheral surface. Note that, in the present embodiment, the form in which the second spray holes 43b are provided at one height position in the vertical direction of the nozzles 43 is illustrated, but this is not essential. The second spray holes 43b may be provided at a plurality of height positions in the vertical direction of the nozzles 43.

The second spray holes 43b are arranged in the cavity 35 at the initial stage of spraying the mold release lubricant, and horizontally face at least either a part of the neck area molding surface 31g, or the shoulder area molding surface 31h, or both. Then, the mold release lubricant reaches the second spray holes 43b through a path (not shown) inside the nozzle 43, and is sprayed onto the neck area forming surface 31g and the shoulder forming surface 31h. For example, the mold release lubricant is sprayed from the second spray holes 43b as the nozzles 43 rises, so that the mold release lubricant is applied to the entire surface of the neck area forming surface 31g and the shoulder area forming surface 31h.

In a later stage of spraying the mold release lubricant, the nozzle 43 is raised so as to be pulled out of the cavity 35 by the position changing mechanism 42. Subsequently, the mold release lubricant is applied to the opposing surface 31e of the blow mold 31, the opposing surface 21e of the finish mold 21, and the entire surface of the finish forming surface 21d among the inner surfaces of the finish mold 21.

As described above, each of the spray holes 43a and 43b function as an application part for applying the mold release lubricant to the blow mold 31, the bottom mold 32, and the finish mold 21.

With such a structure, the nozzles 43 applies the mold release lubricant to the blow molds 31 when the finish molds 21 are located above the blow molds 31, so that the mold release lubricant is applied to the finish forming surface 21d of the finish mold 21, the opposing surface 31e of the blow mold 31, which is facing the finish mold 21, and the area of the blow mold forming surfaces 31f, which is from the neck area forming surface 31g to the shoulder area forming surface 31h, as well as to the entire surface of the bottom mold forming surface 32f. Furthermore, in the above description, the nozzles 43 are structured to apply the mold release lubricant to the neck area forming surface 31g and the shoulder area forming surface 31h in the blow mold forming surfaces 31f. The area where the mold release lubricant is applied is not limited to this example. For example, the nozzles 43 may apply the mold release lubricant to a part of the body area forming surface 31i in the blow mold forming surfaces 31f.

When an engraved area is formed as a letter or a pattern on the side surface of the body area 103d or the like of the glass bottle 103, the mold release lubricant may be sprayed from the first spray holes 43a or the second spray holes 43b, on the location of the blow mold forming surface 31f where an engraved area forming surface for forming the engraved area as the letter or the pattern is formed. In the case of the present embodiment, for example, the mold release lubricant may be sprayed and applied from the second spray holes 43b to the engraved area forming surface 31m provided on the part of the body area forming surface 31i.

With the above-described structure, the nozzles 43 is structured to apply the mold release lubricant to at least one or more from the neck area forming surface 31g, the shoulder area forming surface 31h, the engraved area forming surface 31m, and the opposing surface 31e of the blow mold 31, which is facing the finish mold 21 while provided adjacent to the neck area forming surface 31g, as well as to the entire surface of the bottom mold forming surface 32f. In addition, the nozzle 43 structured as a multidirectional nozzle is structured so as to apply the mold release lubricant to at least one or more from the neck area forming surface 31g, the shoulder area forming surface 31h, the engraved area forming surface 31m, and the opposing surface 31e of the blow mold, which is facing the finish mold 21 and provided adjacent to the neck area forming surface 31g, as well as to the entire surface of the bottom mold forming surface 32. In addition, the nozzle 43 is further structured to apply the mold release lubricant to the opposing surface 31e of the blow mold 31, which is facing the finish mold 21 and provided adjacent to the neck area forming surface 31g, and the neck area forming surface 31g.

Note that, inside the nozzle 43, the path for supplying the mold release lubricant to the first spray holes 43a and the path for supplying the mold release lubricant to the second spray holes 43b may be a continuous path, or may be different paths. For example, inside the nozzle 43, one path is provided that extends in the vertical direction to supply the mold release lubricant, which is supplied to the second spray holes 43b in the middle of the one path, and the mold release lubricant may be supplied to the first spray holes 43a through the downstream side of the path. Alternatively, when two paths are provided inside the nozzle 43 and extend vertically to supply the mold release lubricant separately, one of the paths may supply the mold release lubricant to the second spray holes 43b, and the other path may supply the mold release lubricant may be supplied to the first spray holes 43a.

The method of spraying the mold release lubricant from each of the spray holes 43a and 43b may be a method using a pump (for example, a plunger pump) or a method using a two-fluid mixture (mixing of the mold release lubricant and air) with compressed air.

The first spray holes 43a sprays the mold release lubricant so as to form a first spray pattern J1, for example, in full cone spray. The first full cone spray pattern J1 is formed such that the first spray holes 43a faces, for example, downward from a position surrounded by the blow mold 31. The area where the first full cone spray pattern J1 is formed, is set appropriately by setting the shape of the first spray holes 43a, the height position of the first spray holes 43a, and the spray pressure of the mold release lubricant from the first spray holes 43a.

The second spray holes 43b are provided with many spray holes circumferentially, for example, each sprays the mold release lubricant so as to form a second full cone spray pattern J2. The second full cone spray pattern J2 is formed so as to face a substantially horizontal direction. The area where the second full spray pattern J2 is formed is set appropriately by setting the shape of the second spray holes 43b, the height position of the second spray holes 43b, and the spray pressure of the mold release lubricant from the second spray holes 43b.

When the mold release lubricant is sprayed by the nozzles 43, the nozzles 43 may be changed its position up and down with respect to the blow molds 31 by the position changing mechanism 42, or may be stationary. Further, an annular plate located coaxially with the nozzles 43 may be attached to the outer peripheral surface of the nozzles 43 near the second spray holes 43b. When the annular plate is provided, the annular plate can prevent the mold release lubricant from being excessively scattered to unintended locations.

In the present embodiment, the mold release lubricant applying operation by the application equipment 40 is performed in the swab cycle, which is an operation cycle different from a normal bottle manufacturing cycle, without the gob 101 being supplied in the manufacturing equipment 1. In this swab cycle, when the finish molds 21 are located above the blow molds 31, the application equipment 40 applies the mold release lubricant to the blow molds 31 and the finish molds 21.

Next, an example of the operation of applying the mold release lubricant by the application equipment 40 is described more specifically. The application of the mold release lubricant by the application equipment 40, as described above, allows the application of mold release lubricant, at least either a part of the blow mold forming surfaces 31f provided on the blow molds 31, or the entire surfaces of the bottom mold forming surfaces 32f provided on the bottom molds 32, or both. The step of applying the mold release lubricant by the application equipment 40 constitutes a method of applying the mold release lubricant to the glass bottle blow molds according to the present embodiment, and constitutes a mold release lubricant application step in the method of manufacturing the glass bottles according to the present embodiment.

Figure 6:
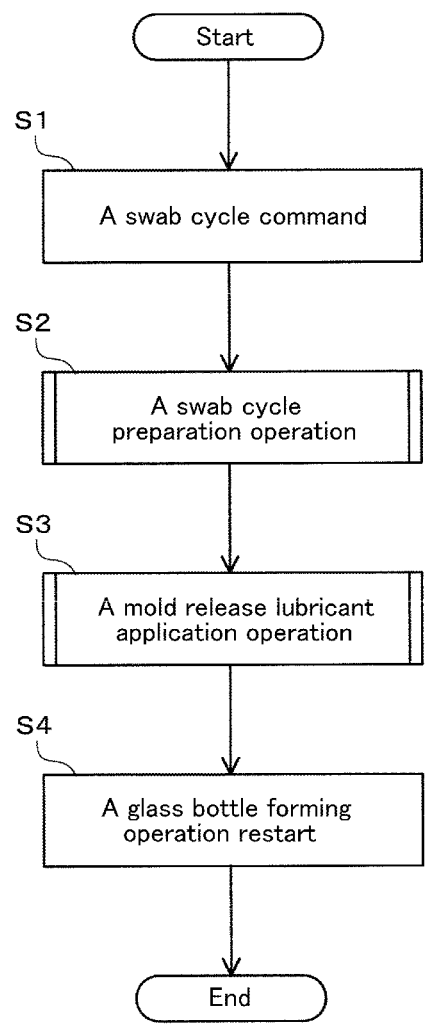
FIG. 6 is an explanatory flowchart of application operation of the mold release lubricant by the application equipment.

FIG. 6 is a flow chart for explaining the mold release lubricant application process using the application equipment 40. Furthermore, the following explanation referencing the flow chart will contain references to diagrams other than the flow chart.

Referring to FIG. 6, the application equipment 40 performs a mold release lubricant application operation in between glass bottle forming operations by manufacturing equipment 1. Specifically, first, the control portion 41 periodically issues a swab cycle command (Step S1). Thus, a swab cycle preparation operation is performed (Step S2). Next, a mold release lubricant application operation (Step S3) is performed. When the mold release lubricant application operation is completed, the above-described glass bottle forming operation is restarted (Step S4).

Next, details of the swab cycle preparation operation (Step S2) and the mold release lubricant application operation (Step S3) are described.

Figure 7:
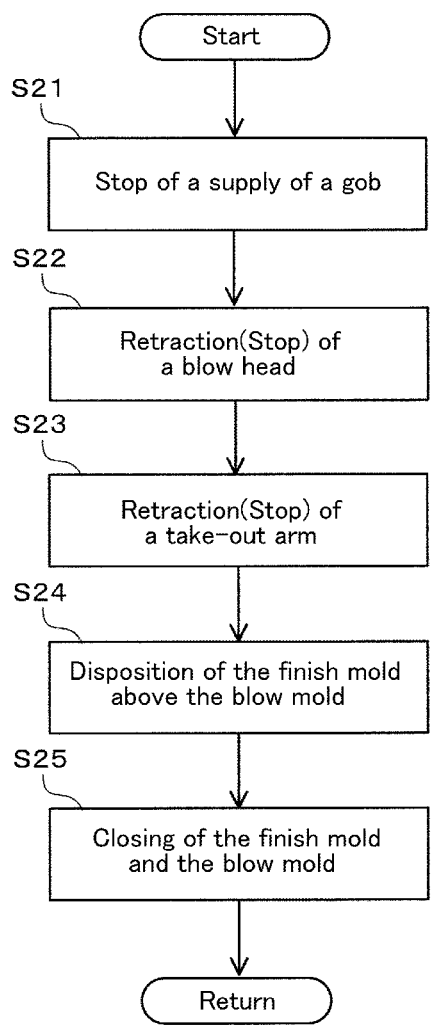
FIG. 7 is a flowchart showing an example of a process of a preparatory operation of Swab Cycle (Step S2).
Figure 8:
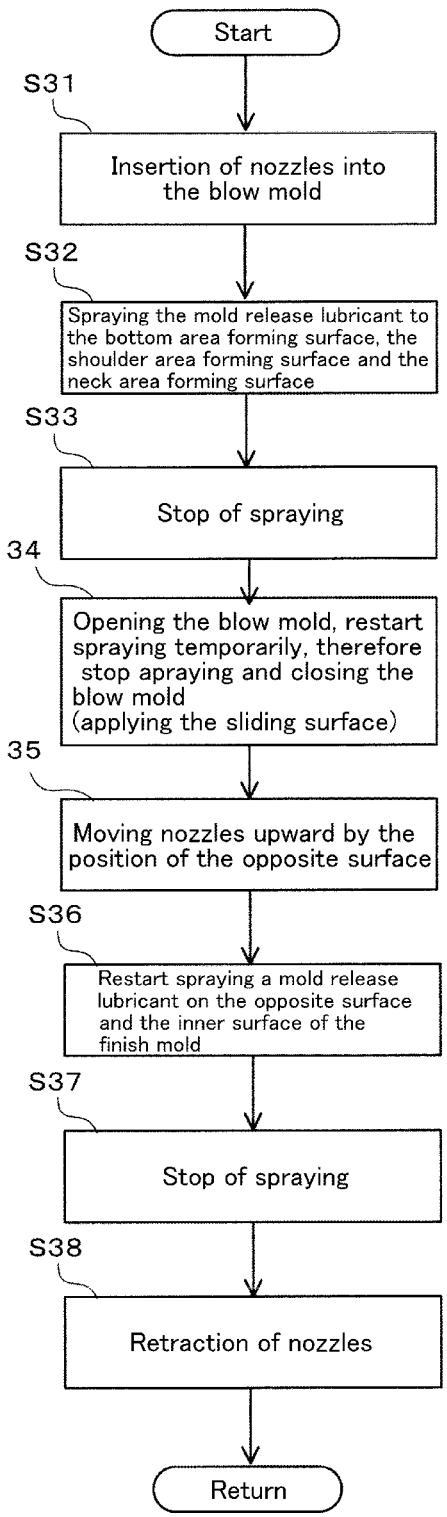
FIG. 8 is a flowchart showing an example of a process of mold release lubricant application (Step S3).

FIG. 7 is a flow chart showing one example of the swab cycle preparation process (Step S2). FIG. 8 is a flow chart showing one example of the mold release lubricant application process (Step S3).

Referring to FIG. 7, in the swab cycle preparation operation, first, a gob supply device (not shown) that has received a command from the control portion 41 uses the interceptor function to stop supplying the gobs 101 from the gob supply device to the blank mold 11 (Step S21). Next, after finishing the final blow process on the blow mold side, the blow heads 34 are operated by the drive mechanism receiving the command from the control portion 41, retracts from the upper surface of the blow molds 31, and stops in that state (Step S22). Next, the blow molds 31 are opened, and a take-out arm (not shown) takes out the glass bottles 103 from the blow molds 31, which is formed in the blow molds 31 and then maintains the state (retreated state) via a drive mechanism receiving a command from the control portion 41 (Step S23).

Figure 9A:
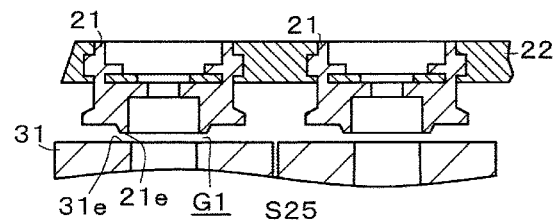
FIG. 9A to FIG. 9C are explanatory diagrams of examples of the mold release lubricant application operation by the application equipment.

As shown in FIG. 9A, with the operation of the rotary shaft 24 to which the mold holder 22 is attached, by the drive mechanism receiving a command from the control portion 41, the finish molds 21 are located above the blow molds 31 (Step S24). This operation is performed almost simultaneously with Step S23.

Next, the pairs of split molds 31a and 31b of the blow molds 31 are closed by the operation of the blow mold opening/closing mechanism receiving the instruction from the control portion 41, while the pairs of split molds 21a and 21b of the finish molds 21 are closed by the operation of the opening/closing mechanism (not shown) (Step S25). At this time, the vertical distance (the length of the gap G1) between the opposing surface 21e of the finish mold 21 and the opposing surface 31e of the blow mold 31 is set to be about 1 mm.

Next, the mold release lubricant application operation (Step S3) is described.

Figure 9B:
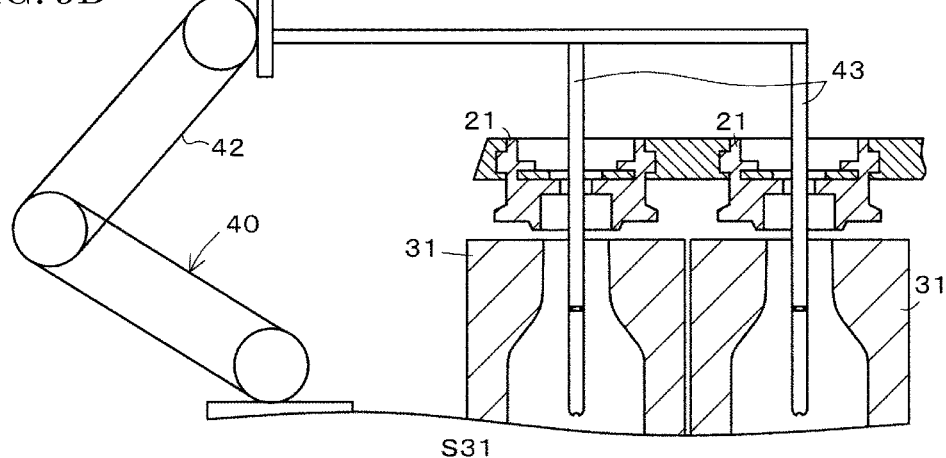
Figure 9C:
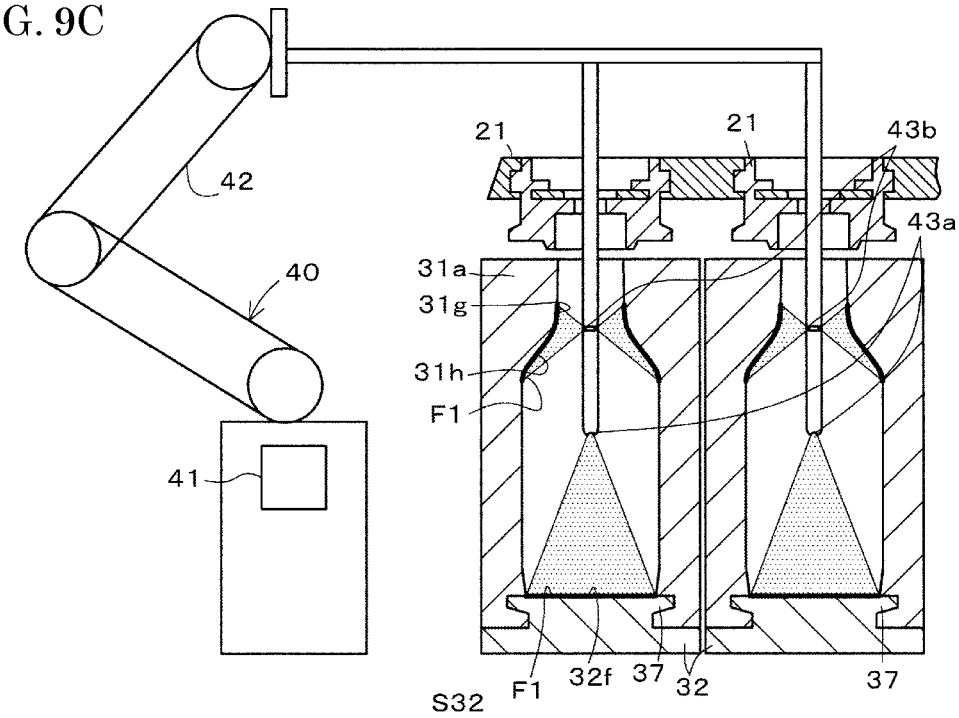

Referring to FIG. 8, in the mold release lubricant application operation, first, as shown in FIG. 9B, the control portion 41 operates the position changing mechanism 42 to insert the nozzles 43 into the finish molds 21 and the blow molds 31 (Step S31). Next, the control portion 41 operates the mold release lubricant supply mechanism to spray the mold release lubricant from the first spray holes 43a and the second spray holes 43b of the nozzles 43, as shown in FIG. 9 (C). Thereby, the mold release lubricant is sprayed on the entire surface of the bottom mold forming surface 32f of the bottom mold 32, the shoulder area forming surface 31h and the neck area forming surface 31g of the blow mold 31 (Step S32). As a result, a coat F1 of the mold release lubricant is formed on the bottom mold forming surface 32f, the shoulder area forming surface 31h, and the neck area forming surface 31g. In this manner, the nozzles 43 applies the mold release lubricant when the pairs of split molds 31a and 31b of the blow mold 31 are closed.

Figure 10A:
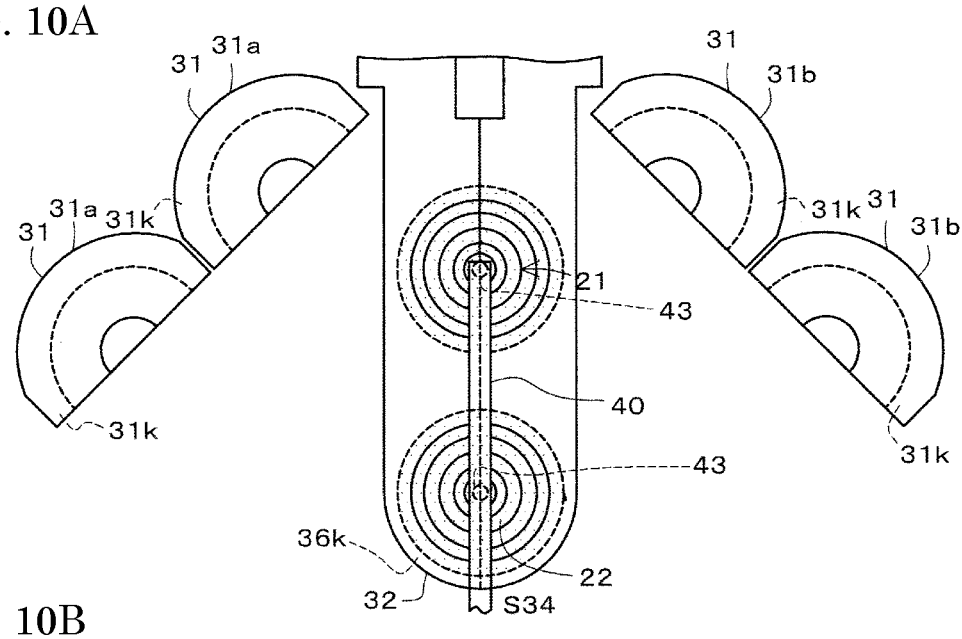
FIG. 10A and FIG. 10B are explanatory diagrams of examples of the mold release lubricant application operation by the application equipment.

Next, the control portion 41 temporarily stops spraying the mold release lubricant from the nozzles 43 (Step S33). Then, as shown in FIG. 10A, the control portion 41 operates the blow mold opening/closing mechanism to once open the pairs of split molds 31a and 31b of the blow molds 31. At this time, spraying is performed temporarily, and a mold release lubricant (lubricant) is applied to the sliding surfaces 36k of the bottom molds 32. Thereafter, the control portion 41 operates the blow mold opening/closing mechanism to cause the pairs of split molds 31a and 31b of the blow molds 31 to close again (step S34). Instead of omitting Step S33, and the mold release lubricant may be applied to the sliding surfaces 36k of bottom molds 32 with the pairs of split molds 31a and 31b of the blow molds 31 opening/closing while spraying the mold release lubricant from the nozzles 43.

Figure 10B:
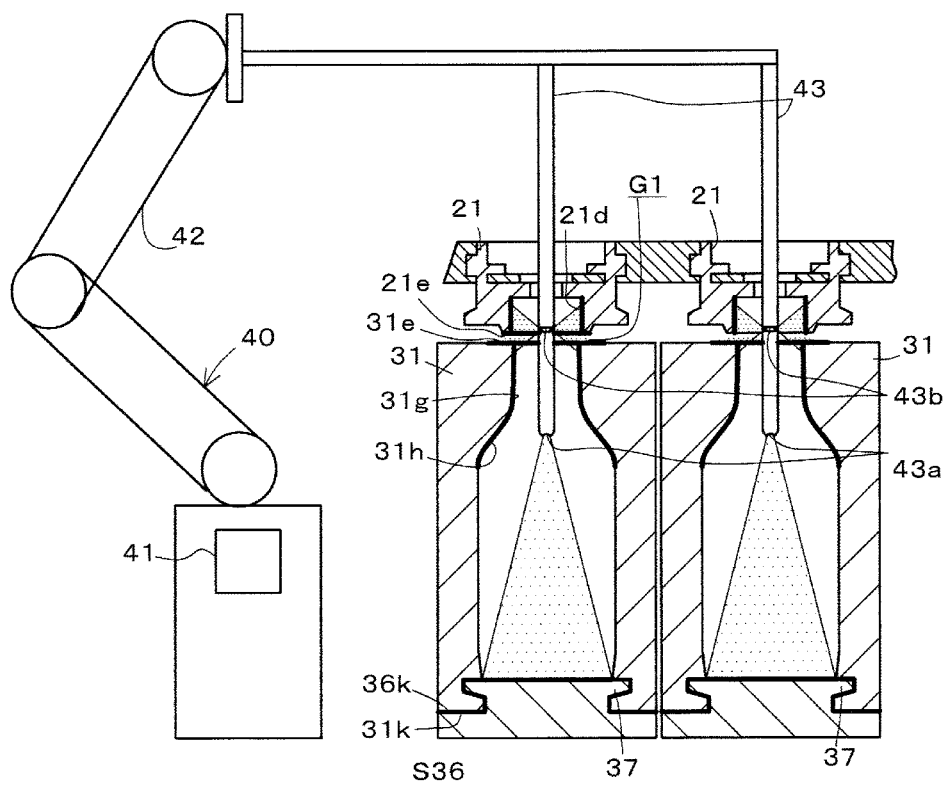

Next, as shown in FIG. 10 (B), the control portion 41 have a position of the nozzles 43 upward by operating the position changing mechanism 42 (step S35). Next, the control portion 41 restarts spraying the mold release lubricant from each of the spray holes 43a and 43b of the nozzles 43 by operating the mold release lubricant supply mechanism (step S36). The order of the steps 35 and 36 may be reversed. For a product having a long neck area that needs to be applied to the entire surface, the nozzles 43 may be changed the position to apply the entire neck area forming surface 31g after the application is resumed. For products having a short neck area that does not need to be applied to the entire surface, excessive supply of the mold release lubricant can be prevented by changing the position of the nozzles 43 while spraying of the mold release lubricant by the nozzles 43 is stopped. Accordingly, the control portion 41 again sprays the mold release lubricant on the bottom mold forming surface 32f from the first spray holes 43a, and at the same time, sets the second spray holes 43b to the vicinity of the opposing surface 21e and 31e of the finish mold 21 and the blow mold 31 to spray on these opposing surfaces 21e and 31e. Then, when the nozzles 43 are further changed the position upward, the mold release lubricant from the second spray holes 43b is applied to the finish area forming surface 21d. Note that when the second spray holes 43b face the gap G1 between the opposing surfaces 21e and 31e, the changing position upward of the nozzles 43 may be temporarily stopped. Thereby, more mold release lubricant can be applied to the opposing surfaces 21e and 31e.

When the spraying of the mold release lubricant on the finish area forming surfaces 21d of the finish molds 21 from the second spray holes 43b is completed, the control portion 41 stops operation of the mold release lubricant supply mechanism and stops spraying the mold release lubricant from the nozzles 43 (Step S37). Then, the control portion 41 causes the nozzles 43 to retreat from the finish molds 21 by operating the position changing mechanism 42 (Step S38).

The above is an example of the operation of applying the mold release lubricant by the application equipment 40. Next, a modification of the operation of applying the mold release lubricant by the application equipment 40 will be described. This modification is different from the above-described mold release lubricant application operation in that the mold release lubricant application operation is performed in a state in which the finish molds 21 are located below the blank mold 11 (at a position A1). Also, in this modification, a swab cycle command (Step S1), a swab cycle preparation operation (Step S2), a mold release lubricant application operation (Step S3) and a glass bottle forming operation restart (Step S4) are performed. On the other hand, in this modification, details of the swab cycle preparation operation (Step S2) and details of the mold release lubricant application operation (Step S3) are different. Hereinafter, differences from the above embodiment is mainly described.

Figure 11:
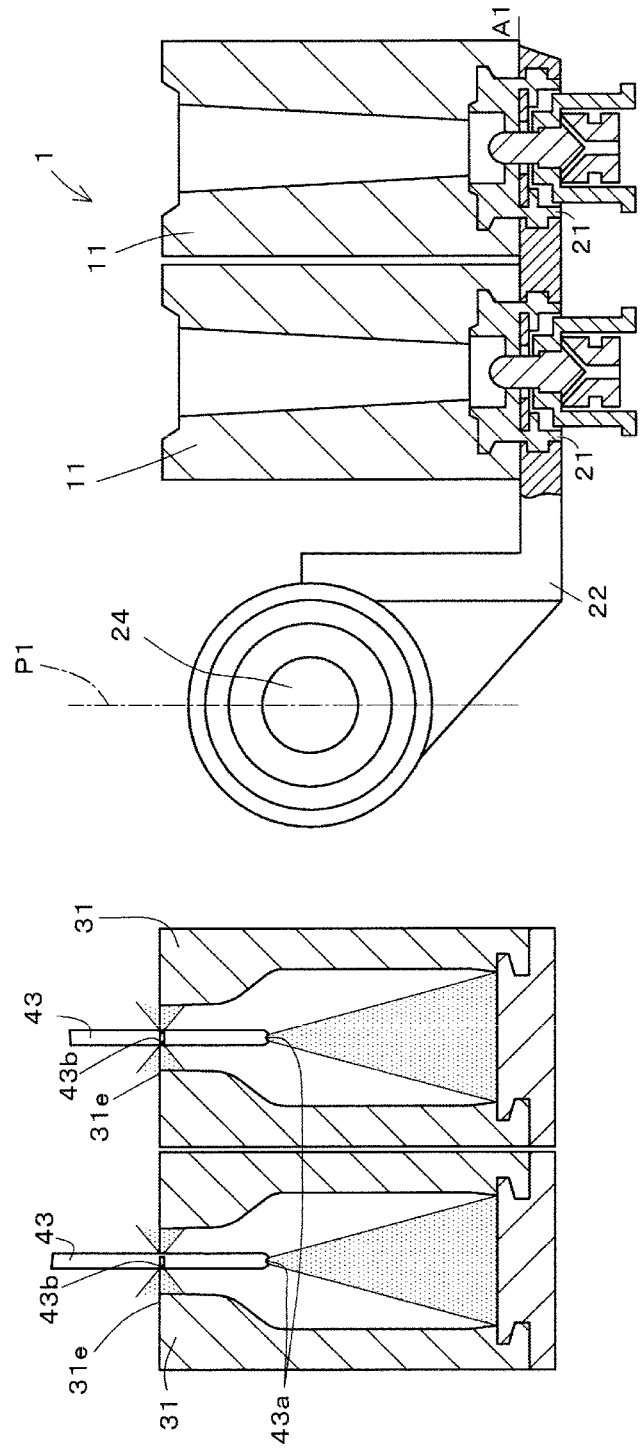
FIG. 11 is an explanatory diagram showing an example of a first modification of the present invention.

In this modification, the operation of arranging finish molds 21 above blow molds 31 in Step S24 of FIG. 7 is not performed. For this reason, the finish molds 21 are arranged at a position A1 below the blank molds 11 as shown in FIG. 11.

Then, in the mold release lubricant application operation in Step S3, the mold release lubricant is not sprayed on the finish molds 21 from the nozzles 43 in Step S36, and the mold release lubricant is applied to the opposing surfaces 31e of the blow molds 31 from the second spray holes 43b of the nozzles 43. (Step S36').

In the above-described embodiment and the modification, in the mold release lubricant applying operation (Step S3), once the opening and closing operation of the blow molds 31 is performed (Step S34), the mold release lubricant is applied to the sliding surfaces of the bottom molds 32. However, the described form is a mere example, which is not necessarily the same. The above step S34 may be omitted.

However, in the above-described embodiment and the modification, the form in which the glass bottles 103 are formed by the blow and blow process is described as an example, but this is not essential. For example, the glass bottle may be formed by the press and blow process (PB) or the narrow neck press blow process (NNPB).

As described above, according to the present embodiment, the application equipment 40 is structured to apply the mold release lubricant to at least either a part of the blow mold forming surfaces 31f provided on the blow molds 31, or the entire surface of the bottom mold forming surfaces 32f provided on the bottom molds 32 located below the blow molds 31, or both. According to this structure, the mold release lubricant is applied to the blow molds 31 and the bottom molds 32 by the application equipment 40. That is, since workers do not need to the manual work of applying the mold release lubricant to the blow molds 31 and the bottom molds 32, it is possible to reduce the burden on workers involved in the bottle-making operation, and the safety of workers in the mold release lubricant applying operation can be further improved. In addition, since a quick mold release lubricant applying operation by the automatic operation can be realized, the downtime in forming the glass bottles 103 can be reduced, compared to the manual work of applying the mold release lubricant, the applying operation by the application equipment 40 can reduce a change in the location or a variation in the application amount of the mold release lubricant applied to the blow molds 31 and the bottom molds 32. Further, the mold release lubricant is applied to at least either a part of the blow mold forming surfaces 31f provided on the blow molds 31, or the entire surfaces of the bottom mold forming surfaces 32f provided on the bottom molds 32 located in the lower part of the blow molds 31, or both. With this structure, it is possible to sufficiently apply the mold release lubricant to a part of blow molds 31 where the release property is particularly required, as well as to minimize the application of the mold release lubricant to a location that is not particularly required. As a result, since an adverse effect on the glass bottle 103 due to an excessive amount of the mold release lubricant can be prevented, the structure suitable for applying the mold release lubricant to the blow molds 31 can be realized, thereby contributing to stabilization of the quality of the glass bottle.

Furthermore, according to the present embodiment, the application equipment 40 comprises the nozzles 43 for spraying the mold release lubricant, and the blow mold forming surfaces 31f comprises the neck area forming surface 31g for forming the neck area 103b of the glass bottle 103, the shoulder area forming surface 31h located below the neck area forming surface 31g for forming the shoulder area 103c of the glass bottle 103, and the engraved area forming surface 31m for forming the engraved area that is located below the shoulder area forming surface 31h and provided on a part of the body area forming surface 31*i* for forming the body part 103*d* of the glass bottle 103, having uneven shape with respect to the body part 103*d* of the glass bottle 103. Furthermore, the nozzles 43 comprises a structure to apply the mold release lubricant, to at least one or more from the neck area forming surface 31*g*, the shoulder area forming surface 31*h*, the engraved area forming surface 31*m*, and the opposing surface 31*e* of the blow mold 31, which is facing the finish mold 21 and provided adjacent to the neck area forming surface 31*g*, as well as to the entire surface of bottom mold forming surfaces 32*f*. Therefore, with this structure, the mold release lubricant is applied to the entire surface of the bottom mold forming surface 32*f*, as well as to at least one or more from the neck area forming surface 31*g*, the shoulder area forming surface 31*h*, engraved area forming surface 31*m*, and the opposing surface 31*e* of the blow mold, which is facing the finish mold 21. As such, using this structure, it is possible to apply the mold release lubricant to the entire surface of the bottom mold forming surface 32*f* as well as to more accurately apply the mold release lubricant to locations on the blow mold 31 that particularly requires mold releasability.

Furthermore, according to this embodiment, the application equipment 40 comprises a structure whereby the nozzles 43 further applies the mold release lubricant to the opposing surface 31*e* of the blow mold 31, which is facing the finish mold 21 and is provided adjacent to the neck area forming surface 31*g*. With this structure, the mold release lubricant can be applied to the opposing surface 31*e* facing the finish mold 21, as well as to the neck area forming surface 31*g*, which prevents the significant burden on the boundary part between the finish area 103*a* and the neck area 103*b* of the glass bottle 103, thereby can prevent an occurrence of cracks in the boundary part between the finish area 103*a* and the neck area 103*b*.

With this structure, the mold release lubricant can be applied more accurately to locations of the blow mold 31 that particularly requires mold releasability, which can prevent the occurrence of cracks in the boundary part between the finish area 103*a* and the neck area 103*b*.

Further, according to the present embodiment, the application equipment 40 includes multidirectional nozzles 43, as the nozzles 43 (in this embodiment, two-directional nozzles 43) that sprays the mold release lubricant in a plurality of different directions. The multidirectional nozzle 43 applies the mold release lubricant, at least one or more from the neck area forming surface 31*g*, a shoulder area forming surface 31*h*, the engraved area forming surface 31*m*, and an opposing surface 31*e* of the blow mold 31, which is facing the finish mold 21 and is provided adjacent to the neck area forming surface 31*g*, as well as to the entire bottom forming surface 32*f*. With this structure, the mold release lubricant application operation can be carried out rapidly. In addition, the mold release lubricant is applied to a plurality of locations (two locations in the present embodiment), at least one or more from the neck area forming surface 31*g*, the shoulder forming surface 31*h*, the engraved area forming surface 31*m* and the opposing surface 31*e* of the blow mold 31 facing the finish mold 21, as well as to the entire surface of the bottom mold forming surface 32*f* from different locations of the nozzle 43. As a result, unlike the case comprising a single directional nozzle, through which the mold release lubricant is applied to, at least one or more from the neck area forming surface 31*g*, the shoulder area forming surface 31*h*, the engraved area forming surface 31*m*, and opposing surface 31*e* of the blow mold 31, which is facing the finish mold 21, as well as to the entire bottom mold forming surface 32*f*, an operation to change the direction of the nozzle 43 during the mold release lubricant application, is eliminated, which can reduce changes of location to which the mold release lubricant is applied and variations in the amount to apply, thereby contributing to glass bottle quality stabilization.

Further, according to the present embodiment, the application equipment 40 applies the mold release lubricant when the pairs of split molds 31*a* and 31*b* of the blow molds 31 are closed. According to this structure, the mold release lubricant can be applied in a state where the distance between the nozzles 43 and the locations where the mold release lubricant is applied among respective areas in the blow mold 31 is more uniform. Further, it is possible to more reliably prevent the mold release lubricant from scattering to the outside of the blow molds 31.

Further, according to the present embodiment, the application equipment 40 applies the mold release lubricant at a timing when the parison 102 is not inserted into the blow molds 31. According to this structure, it is possible to prevent direct adhesion of the mold release lubricant on the parison 102 applied from the application equipment 40 to the blow molds 31.

Further, according to the present embodiment, the application equipment 40 applies the mold release lubricant to the sliding surfaces 36*k* of the bottom molds 32 when the pair of split molds 31*a* and 31*b* of the blow molds 31 are opened. Thereby, smooth sliding between the blow mold 31 and the bottom mold 32 can be realized, and as a result, an excessive force acting on the glass bottle 103 formed by the blow molds 31 can be.

Further, according to the present embodiment, the application equipment 40 applies the mold release lubricant to blow molds 31 when the finish molds 21 are located above the blow molds 31, so that mold release lubricant can be applied to the finish molds 21 and the blow molds 31 simultaneously. According to this configuration, when applying mold release lubricant to the blow molds 31, the application equipment 40 can also apply the mold release lubricant to the finish molds 21. Further, with this structure, the mold release lubricant applied to the finish molds 21 from the application equipment 40 can surely be prevented from adhering to a place where the mold release lubricant is not preferable to adhere, such as the plunger 16 located below the blank mold 11. This can prevent the occurrence of inner contamination and internal dirt of the parison 102; in other words, as this can prevent inner contamination and dirt of the glass bottle 103*a*, as a result, it is possible to prevent a decline in the strength of the glass bottle 103. It is possible to prevent cases of glass forming failures due to insufficient solidification due to a decline in adhesion between the plunger and the parison caused by the mold release lubricant adhering to the plunger when, for example, conducting press and blow forming (PB) or narrow neck press blow forming (NNPB).

In this embodiment of the invention, the application equipment 40 applies the mold release lubricant when a gap G1 is provided between the blow mold 31 and the finish mold 21 to simultaneously apply the mold release lubricant to the corresponding opposing surfaces 21*e* and 31*e* of the finish mold 21 and the blow mold 31. With this structure, the mold release lubricant can be applied to the blow mold 31, as well as to the location of the finish mold, which slides with the blank mold 11. Furthermore, if it's structured to apply the mold release lubricant to the opposing surfaces, 21*e* and 31*e* of the finish mold 21 and the blow mold 31, the finish mold 21 and the blow mold 31 themselves serve a fence that can effectively prevent the mold release lubricant applied by the application equipment 40 from spraying onto locations where application is not required.

In this embodiment of the invention, the manufacturing equipment 1 is structured so that the gob 101 is not supplied and, instead of the standard glass bottle manufacturing cycle, the mold release lubricant is applied to the blow molds 31 and the finish molds 21 during a swab cycle when the finish molds 21 are located above the blow molds 31. With this structure, it is possible to prevent direct adhesion of the mold release lubricant applied from the application equipment 40 on the parison 102. Furthermore, the application equipment 40 can also apply the mold release lubricant to the finish molds 21 when applying the mold release lubricant to the blow molds 31. With this structure, it is possible to prevent adhesion of the mold release lubricant on locations where it is preferable to avoid adhesion such as the plunger 16 located below the blank mold 11. This can prevent the occurrence of inner contamination and dirt of the parison 102; in other words, as this can prevent inner contamination and dirt to the glass bottle 103, as a result, it is possible to prevent declines in the strength of glass bottle 103. Also, it is possible to prevent cases of glass forming failure due to insufficient solidification resulting from a decline in adhesion between the plunger and the parison caused by the mold release lubricant adhesion to the plunger when, for example, conducting press and blow forming (PB) or narrow neck press blow forming (NNPB).

Furthermore, in this embodiment, the application equipment 40 can use the control portion 41 to control the nozzles 43, thereby controlling the actual mold release lubricant applying operation. Specifically, the control portion 41 can operate the position changing mechanism 42 to change the position of the nozzles 43 and to apply the mold release lubricant from the nozzles 43 to the finish molds 21 and the blow molds 31. This enables the more accurate application of the mold release lubricant onto the desired locations on the inner surfaces of the finish molds 21 and the inner surfaces of the blow molds 31.

Further, according to the present embodiment, the application equipment 40 applies the mold release lubricant to the finish molds 21, which are located away from the plungers 16 of the blank mold 11 side on the basis of the position A1 of the finish molds during the parison forming, in other words, when the finish molds are above the blow mold 31. According to this structure, when the mold release lubricant is applied to the finish molds 21, it is possible to prevent the mold release lubricant from adhering to unintended locations other than the finish molds 21, for example, the plunger 16. This can prevent the occurrence of inner contamination and dirt of the parison 102; in other words, as this can prevent inner contamination and dirt of the glass bottle 103, it is possible to prevent declines in the strength of the glass bottle 103. Also, it is possible to prevent cases of glass forming failure due to insufficient solidification resulting from a decline in adhesion between the plunger 16 and the parison caused by the mold release lubricant adhesion to the plunger 16 when, for example, conducting press and blow forming (PB) or narrow neck press blow forming (NNPB). Furthermore, the mold release lubricant is applied to the finish molds 21 by the application equipment 40. That is, it is not necessary for workers to manually apply the mold release lubricant to the finish molds 21, so that the burden on workers involved in the application of the mold release lubricant can be reduced, and the safety of workers in applying the mold release lubricant can be further improved. In addition, since a quick mold release lubricant applying operation by a mechanical operation can be realized, the downtime during the forming of the glass bottles 103 can be shortened, and the application of the mold release lubricant by the application equipment 40 can reduce a change in locations to apply the mold release lubricant to the finish molds 21 and a variation in the amount to apply, compared with the manual work of applying the mold release lubricant.

Further, according to the present embodiment, the application equipment 40 applies the mold release lubricant to the finish area forming surface 21d of the finish mold for forming the finish area 103a of the glass bottle 103, and the opposing surface 21e of the finish mold 21, which is facing the lower surface 11c of the blank mold 11 and opposing surface 31e of the blow mold 31. According to this structure, the mold release lubricant can be applied to locations of the finish molds 21 that slide with the blank molds 11, together with the inner surface of the finish molds.

Further, the application equipment 40 applies the mold release lubricant to finish molds 21 and the blow molds 31 at the same time. According to this structure, when applying the mold release lubricant to the finish molds 21, the application equipment 40 can also apply the mold release lubricant to the blow molds 31.

The embodiment of the invention is as described above. However, the present invention is not limited to the above embodiment, and various changes can be made as long as they are described in the claims.

(1) In the above embodiment and the first modification, the example in which the nozzle 43 is a two-directional nozzle is described. However, this does not necessarily be the case. For example, as shown in FIG. 12A showing a main part of the second modification of the present invention, by adding the third spray holes (application portion) 43c to the nozzle 43, the nozzle 43 may be a three-directional nozzle. The nozzle 43 has the third spray holes 43c in addition to the first and second spray holes 43a and 43b.

The third spray holes 43c are arranged at an intermediate part of the nozzle 43, are formed by a slit or the like, and are structured to spray the mold release lubricant. The third spray holes 43c are structured to spray the mold release lubricant in a direction orthogonal to the axial direction of the blow molds 31, that is, in the present embodiment, a third direction along the horizontal direction and parallel to the second direction as a direction in which the second spray holes 43b face.

The third spray holes 43c are located above the second spray holes 43b (a position advanced from the second spray holes 43b to the base end side of the nozzle 43) which are, for example, arranged plurally on the outer peripheral surface of the nozzle 43 as the center axis of the nozzle 43. The third spray holes 43c are arranged in the cavity of the finish mold 21 in the initial stage of spraying the mold release lubricant, and faces the finish forming surface 21d in the horizontal direction. Then, the mold release lubricant reaches the third spray holes 43c through a path (not shown) inside the nozzle 43, and is sprayed on the finish forming surface 21d.

Thus, each of the spray holes 43a, 43b and 43c functions as an application unit that simultaneously applies the mold release lubricant to the blow molds 31, the bottom molds 32, and the finish molds 21.

(2) Further, in the above-described embodiment and each of the modifications, the example in which the mold release lubricant is sprayed from the nozzles 43 to the blow molds 31 when the nozzles 43 are located in the blow molds 31 has been described. However, this does not necessarily be the case. For example, as shown in FIG. 12B showing the main parts of the third modification of the present invention, when the pairs of split molds 31a and 31b of the blow molds 31 are opened by the finish mold opening/closing mechanism, in addition and when the finish molds 21 are located above the bottom molds 32, the mold release lubricant may be sprayed from the nozzles 43. At this time, the nozzles 43 have, for example, a structure in which the second spray holes 43b are arranged on the tip side of the nozzles 43. Then, the mold release lubricant from the second spray holes 43b are sprayed onto the finish forming surface 21d of the finish mold 21. Then, the mold release lubricant dripping from the finish molds 21 and the mold release lubricant sprayed from the second spray holes 43b dropping downward are received by the bottom molds 32. Thereby, the mold release lubricant may be applied to the entire surfaces of the bottom mold forming surfaces 32 of the bottom molds 32.

(3) In the above-described embodiment and each modification, the form of spraying the mold release lubricant from the nozzles 43 to the finish molds 21, the blow molds 31, and the bottom molds 32 is described. However, this does not necessarily be the case. The nozzles 43 may spray the mold release lubricant on the finish molds 21, the blow molds 31, and the bottom molds 32 one by one.

Figure 13:
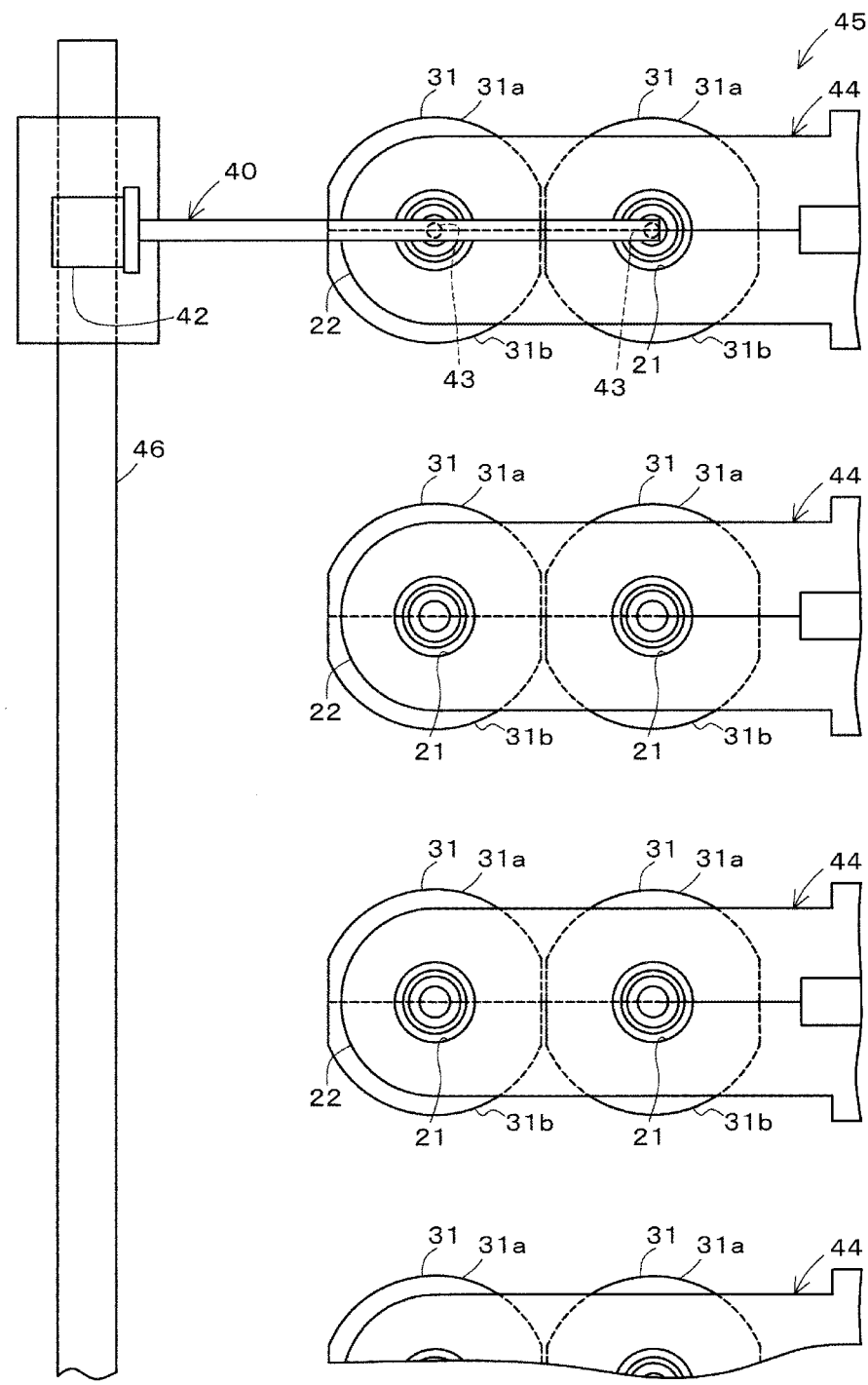
FIG. 13 is a plain view showing main components of an example of a fourth modification of the present invention.

(4) Further, in the above-described embodiment and modifications, a structure in which the mold release lubricant is applied to a plurality of sections 44 in which the blow molds 31 and the finish molds 21 are paired for the application equipment 40 may be adopted. For example, as shown in FIG. 13 which is a plain view showing a main part of a fourth modification of the present invention, for example, in the case that the blow molds 31 (finish molds 21) are arranged in a plurality of sections 44, 44, 44, the mold release lubricant may be applied to the blow molds 31, the bottom molds 32 and the finish molds 21 of the plurality of sections 44 with the application equipment 40. For example, a bottle manufacturing machine is composed of 8 to 12 sections (a pair of one blank mold side and one finish mold side for each section), and the total length of these sections is about 6 to 8 m. FIG. 13 illustrates four sections 44 as an example. In such a structure, for example, The position changing mechanism 42 is installed in the bottle making machine 45 (for all sections 44). The position changing mechanism 42 is structured to be able to reciprocate on a rail 46 passing each side of the plurality of sections 44 powered by a drive mechanism (not shown). Thereby, the application equipment 40 moves to the side of each section 44 and sprays the mold release lubricant on at least either the blow molds 31, or the finish molds 21 in the adjacent section 44, or both.

Figure 14:
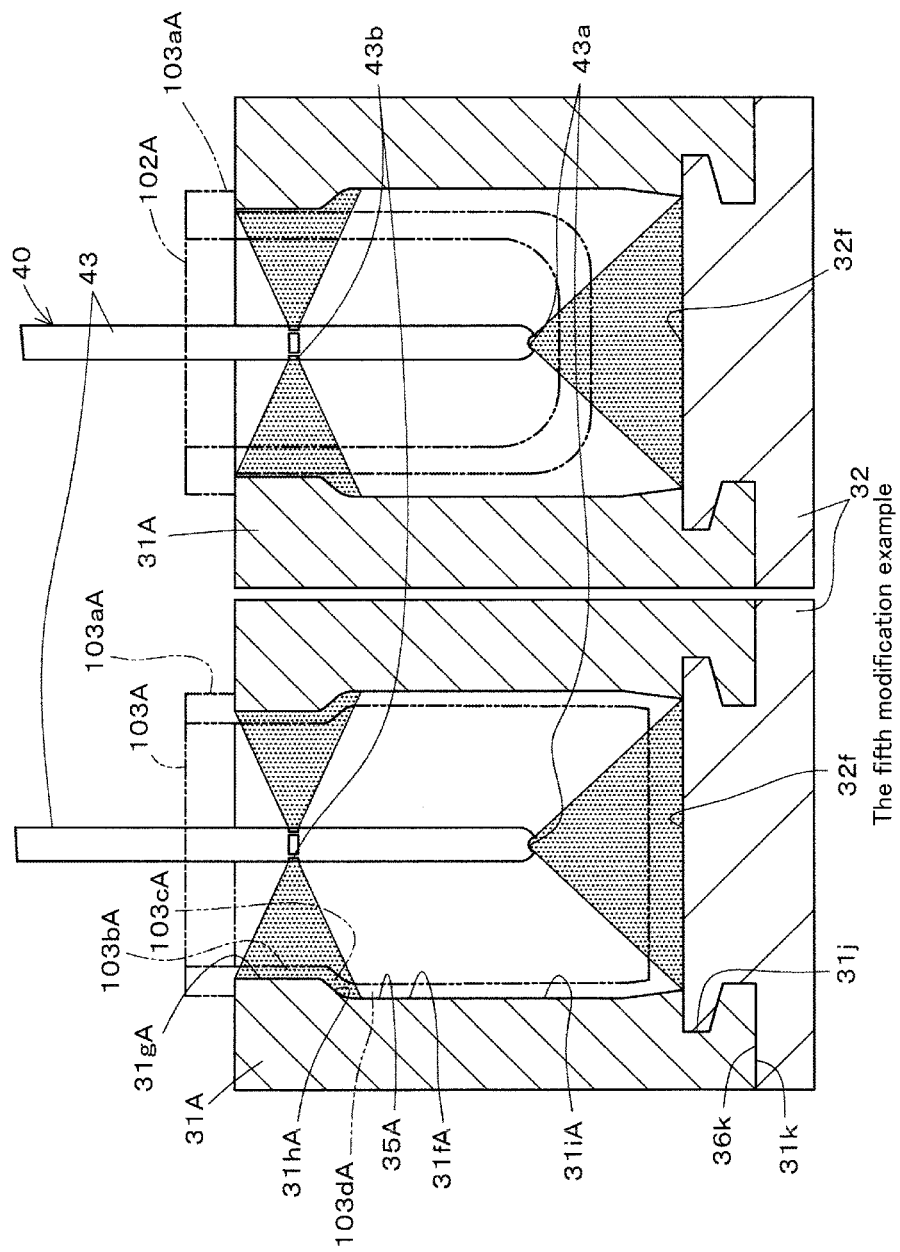
FIG. 14 is a partial cross-sectional view of main components explaining an example of a fifth modification of the present invention.

(5) In the above-described embodiment and each of the modifications, the example in which the manufacturing equipment 1 forms glass bottles having an elongated shape is described. However, this does not necessarily be the case. For example, parisons are formed in press forming blank molds (not shown) instead of the blank mold 11, and the parison may be finish-formed by blow molds 31A shown in FIG. 14. FIG. 14 is a diagram of a main part showing a fifth modification of the manufacturing equipment 1, and showing side surface of blow molds 31A and bottom molds 32. Hereinafter, points different from the above-described embodiment will be mainly described, and the same components will be denoted by the same reference numerals in the drawings, and detailed description thereof will be omitted.

The blow mold 31A cooperates with bottom molds 32 to form the parisons 102A (shown by an imaginary two-doted chain line on the right blow mold 31A), except the finish molds 103aA, into glass bottles 103A (shown by an imaginary two-dotted chain line on the left finish mold 31A). Surface forming the cavity 35A of the inner surface of the blow mold 31A is a blow mold forming surfaces 31fA.

The blow mold forming surfaces 31fA has a neck area forming surface 31gA, a shoulder area forming surface 31hA, and a body area forming surface 31iA.

The neck area forming surface 31gA is, for example, a cylindrical surface having a smaller diameter than the body part forming surface 31iA. The vertical length of the neck area forming surface 31gA is shorter than the vertical length of the body part forming surface 31iA.

The length of the shoulder area forming surface 31hA in the vertical direction is shorter than the length of the body part forming surface 31iA in the vertical direction. The shoulder area forming surface 31hA is structured to form an area of the glass bottle 103A from the R area at the base of a neck area 103bA to an area approaching the body part 103dA.

The body area forming surface 31iA is a cylindrical surface having a substantially constant diameter. The fitting surface 31j is arranged on the bottom side of the body area forming surface 31iA.

The application of the mold release lubricant to the blow molds 31A is performed by the application equipment 40. In this case, the nozzles 43 may move up and down during spraying of the mold release lubricant, or may be stationary without moving up and down. The first spray holes 43a of the nozzles 43 spray the mold release lubricant on the bottom mold forming surfaces 32f, and the second spray holes 43b spray the mold release lubricant on the neck area forming surfaces 31gA and the shoulder area forming surface 31hA.

(6) Also, in the above-described embodiment and the like, the form in which the mold release lubricant is applied using the application equipment 40 is described as an example. However, this does not necessarily be the case. For example, the mold release lubricant may be applied manually by an operator. Further, the application equipment 40 may apply the mold release lubricant by using another application member such as a brush instead of the nozzles 43.

INDUSTRIAL APPLICABILITY

The present invention can be applied widely as an application equipment for applying a mold release lubricant to blow molds for manufacturing glass bottles, as a method of mold release lubricant application for glass bottle blow molds, as a glass bottle manufacturing equipment, and as a method of manufacturing glass bottles.

EXPLANATION OF REFERENCE SIGNS

1 Glass bottle manufacturing equipment
21 Finish mold
21e Opposing surface
31, 31A Blow mold
31a, 31b One pair of split molds of blow mold
31e Opposing surface facing finish mold of blow mold
31f, 31fA Blow mold forming surface
31k Sliding surface
32 Bottom mold
32f Bottom mold forming surface
36k Sliding surface
40 Mold release lubricant application equipment
41 Control portion (control unit)

42 Position changing mechanism
43 Nozzle
43a, 43b, 43c Nozzle holes (application portion)
101 Gob
102, 102A Parison
103, 103A Glass bottle

The invention claimed is:

1. An application equipment for applying a mold release lubricant to one or more glass bottle blow forming molds, wherein:
   the application equipment is structured to apply the mold release lubricant to a part of blow mold forming surfaces provided on blow molds, and entire surfaces of bottom mold forming surfaces provided on bottom molds located in a lower part of the blow molds;
   the application equipment comprises one or more nozzles for spraying the mold release lubricant;
   the blow mold forming surfaces comprise a neck area forming surface to form a neck area of a glass bottle, a shoulder area forming surface to form a shoulder area of the glass bottle located below the neck area forming surface, and an engraved area forming surface to form an engraved area that is located below the shoulder area forming surface and provided on a part of a body area forming surface to form a body area of the glass bottle, having an uneven shape with respect to the body area of the glass bottle;
   the one or more nozzles are structured so as to apply the mold release lubricant to at least one or more surfaces from among the neck area forming surface, the shoulder area forming surface, the engraved area forming surface, and an opposing surface of the blow mold, which is facing a finish mold and provided adjacent to the neck area forming surface, as well as to the entire surfaces of the bottom mold forming surfaces;
   the one or more nozzles are structured as a multidirectional nozzle that sprays the mold release lubricant in a plurality of different directions, and comprise first spray holes located at tips of the nozzles and one or more of second spray holes spaced apart from the first spray holes and provided with a plurality of spray holes circumferentially on an outer peripheral surface of the nozzles;
   the first spray holes spray the mold release lubricant in a first direction along the downward direction of an axial direction of the blow molds, and one or more of the second spray holes spray the mold release lubricant in a second direction along a horizontal direction perpendicular to the axial direction of the blow molds;
   the one or more of the second spray holes of the multidirectional nozzle are structured so as to apply the mold release lubricant to at least one or more surfaces from among the neck area forming surface, the shoulder area forming surface, the engraved area forming surface, and the opposing surface of the blow mold, which is facing the finish mold and provided adjacent to the neck area forming surface, and the first spray holes are structured so as to apply the mold release lubricant to the entire surfaces of the bottom mold forming surfaces; and
   the first spray holes and the one or more of the second spray holes simultaneously spray the mold release lubricant.

2. The application equipment for applying the mold release lubricant to one or more glass bottle blow forming molds according to claim 1, wherein
   the application equipment is structured to apply the mold release lubricant when one or more pairs of split molds of the blow molds are closed.

3. The application equipment for applying the mold release lubricant to one or more glass bottle blow forming molds according to claim 1, wherein
   the application equipment is structured to apply the mold release lubricant when a parison is not inserted into the blow molds.

4. The application equipment for applying the mold release lubricant to one or more glass bottle blow forming molds according to claim 1, wherein
   the application equipment is structured to apply the mold release lubricant to sliding surfaces of the bottom molds, the sliding surfaces being between the blow molds and the bottom molds, when pairs of split molds of the blow molds are opened.

5. The application equipment for applying the mold release lubricant to one or more glass bottle blow forming molds according to claim 1, wherein
   the application equipment is structured to apply the mold release lubricant to finish molds and the blow molds simultaneously by applying the mold release lubricant to the blow molds, when the finish molds are located above the blow molds.

6. The application equipment for applying the mold release lubricant to one or more glass bottle blow forming molds according to claim 5, wherein
   the application equipment is structured to apply the mold release lubricant simultaneously to opposing surfaces of the finish molds and the blow molds, the finish molds and the blow molds facing each other in a state such that a gap is provided between the blow molds and the finish molds.

7. The application equipment for applying the mold release lubricant to one or more glass bottle blow forming molds according to claim 1, wherein
   the application is programmed to apply the mold release lubricant to the blow molds and to finish molds in one of a plurality of different operation cycles including a swab cycle and a regular manufacturing cycle, wherein in the swab cycle, when the finish molds are located above the blow molds, no gob is supplied to a glass bottle manufacturing equipment comprising the blow molds.

8. The application equipment for applying the mold release lubricant to one or more glass bottle blow forming molds according to claim 1, further comprising
   an application portion for applying the mold release lubricant to blow molds and
   a control unit for controlling operations of the application portion.

9. The application equipment for applying the mold release lubricant to one or more glass bottle blow forming molds according to claim 8, wherein
   the application portion is configured so as to have its position changed with respect to the blow molds by a position changing mechanism, and
   the control unit comprises a control portion that controls operations of the position changing mechanism and a supply of the mold release lubricant from the application portion.

10. A bottle manufacturing machine comprising blow molds arranged in a plurality of sections, the bottle manufacturing machine comprising the application equipment for applying the mold release lubricant to one or more glass bottle blow forming molds according to claim 9, and a drive mechanism that allows the position changing mechanism to reciprocate along each section.

11. A glass bottle manufacturing equipment, comprising the application equipment for applying the mold release lubricant to one or more glass bottle blow forming molds according to claim 1.

12. The application equipment for applying the mold release lubricant to one or more glass bottle blow forming molds according to claim 1, wherein the one or more of second spray holes are located at an intermediate area of the nozzles, the first spray holes spray the mold release lubricant so as to form a first spray pattern, the one or more of the second spray holes spray the mold release lubricant so as to form a second spray pattern, and an area of the first spray pattern and an area of the second spray pattern do not overlap with each other.

13. The application equipment for applying the mold release lubricant to one or more glass bottle blow forming molds according to claim 12, wherein the first spray pattern and the second spray pattern are full cone spray patterns.

14. The application equipment for applying the mold release lubricant to one or more glass bottle blow forming molds according to claim 1, wherein the one or more of the second spray holes are located at an intermediate area of the nozzles, and at least one of the one or more of the second spray holes, at an initial stage of spraying the mold release lubricant, horizontally faces at least a part of either the neck area forming surface or the shoulder area forming surface.

15. The application equipment for applying the mold release lubricant to one or more glass bottle blow forming molds according to claim 14, wherein the nozzles are raised in a later stage of spraying the mold release lubricant.

16. A method of applying mold release lubricant to blow molds for manufacturing glass bottles, wherein:

the mold release lubricant is applied to a part of blow mold forming surfaces provided on blow molds and entire surfaces of bottom mold forming surfaces provided on bottom molds, which are located in a lower part of the blow molds;

the blow mold forming surfaces comprise a neck area forming surface to form a neck area of a glass bottle, a shoulder area forming surface to form a shoulder area of the glass bottle located below the neck area forming surface, and an engraved area forming surface to form an engraved area that is located below the shoulder area forming surface and provided on a part of a body area forming surface to form a body area of the glass bottle, having an uneven shape with respect to the body area of the glass bottle;

one or more nozzles comprise first spray holes located at tips of the nozzles and one or more of second spray holes spaced apart from the first spray holes and provided with a plurality of spray holes circumferentially on an outer peripheral surface of the nozzles;

the first spray holes spray the mold release lubricant in a first direction along a downward direction of an axial direction of the blow molds, and one or more of the second spray holes spray the mold release lubricant in a second direction along a horizontal direction perpendicular to the axial direction of the blow molds;

the one or more of the second spray holes are structured so as to apply the mold release lubricant to at least one or more surfaces from among the neck area forming surface, the shoulder area forming surface, the engraved area forming surface, and an opposing surface of the blow mold, which is facing a finish mold and provided adjacent to the neck area forming surface, and the first spray holes are structured so as to apply the mold release lubricant to the entire surfaces of the bottom mold forming surfaces; and the first spray holes and the one or more of the second spray holes simultaneously spray the mold release lubricant.

17. A method of manufacturing a glass bottle, comprising:

a mold release lubricant application step for applying mold release lubricant to a part of blow mold forming surfaces provided on blow molds, and entire surfaces of bottom mold forming surfaces provided on bottom molds located in a lower part of the blow molds, and a forming step to form glass bottles with the blow molds, in the mold release lubricant application step, one or more nozzles are provided for spraying the mold release lubricant, the nozzles comprise first spray holes located at tips of the nozzles and one or more of second spray holes spaced apart from the first spray holes and provided with a plurality of spray holes circumferentially on an outer peripheral surface of the nozzles, the first spray holes spray the mold release lubricant in a first direction along a downward direction of an axial direction of the blow molds, and one or more of the second spray holes spray the mold release lubricant in a second direction along a horizontal direction perpendicular to the axial direction of the blow molds, the blow mold forming surfaces comprise a neck area forming surface to form a neck area of a glass bottle, a shoulder area forming surface to form a shoulder area of the glass bottle located below the neck area forming surface, and an engraved area forming surface to form an engraved area that is located below the shoulder area forming surface and provided on a part of a body area forming surface to form a body area of the glass bottle, having an uneven shape with respect to the body area of the glass bottle, and in the mold release lubricant application step, the one or more of the second spray holes are structured so as to apply the mold release lubricant to at least one or more surfaces from among the neck area forming surface, the shoulder area forming surface, the engraved area forming surface, and an opposing surface of the blow mold, which is facing a finish mold and provided adjacent to the neck area forming surface, and the first spray holes are structured so as to apply the mold release lubricant to the entire surfaces of the bottom mold forming surfaces; and the first spray holes and the one or more of the second spray holes simultaneously spray the mold release lubricant.

* * * * *